United States Patent
Sugimoto et al.

(10) Patent No.: US 12,491,827 B2
(45) Date of Patent: Dec. 9, 2025

(54) RETAINING MEMBER AND WIRE HARNESS

(71) Applicant: YAZAKI CORPORATION, Tokyo (JP)

(72) Inventors: Shunya Sugimoto, Makinohara (JP); Hiroshi Yamashita, Makinohara (JP); Shinji Kato, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 299 days.

(21) Appl. No.: 18/501,965

(22) Filed: Nov. 3, 2023

(65) Prior Publication Data

US 2024/0166146 A1    May 23, 2024

(30) Foreign Application Priority Data

Nov. 18, 2022   (JP) .................................. 2022-184646
Jul. 13, 2023   (JP) .................................. 2023-115286

(51) Int. Cl.
*B60R 16/02*   (2006.01)

(52) U.S. Cl.
CPC .................. *B60R 16/0215* (2013.01)

(58) Field of Classification Search
USPC ........................................................ 174/72 A
See application file for complete search history.

(56) References Cited

U.S. PATENT DOCUMENTS

| | | | |
|---|---|---|---|
| 6,213,674 B1 * | 4/2001 | Sasaki | F16C 1/265 384/208 |
| 7,645,938 B2 * | 1/2010 | Kogure | H02G 11/006 174/72 A |
| 2003/0222183 A1 * | 12/2003 | Kato | B60R 16/0215 248/49 |
| 2021/0016725 A1 | 1/2021 | Yamashita et al. | |

FOREIGN PATENT DOCUMENTS

JP    2021-19386 A    2/2021

* cited by examiner

*Primary Examiner* — Timothy J Thompson
*Assistant Examiner* — Michael F McAllister
(74) *Attorney, Agent, or Firm* — KENEALY VAIDYA LLP

(57) ABSTRACT

A retaining member includes a first member and a second member. The first and second member have an engagement structure, thereby forming a retaining structure and an opening through which an electric wire is drawn out. The retaining structure sandwiches and retains a tip end of an exterior member by a groove provided in the first and second members. The first and second members have a regulating structure that regulates pinching of the electric wire in a gap between the first and second members. The regulating structure includes a protrusion in one of the first and second members, and a facing wall in the other member. The regulating structure is configured such that the protrusion and the facing wall overlap each other in a state where the first and second members are most separated from each other within a range allowed by a clearance of the engagement structure.

6 Claims, 23 Drawing Sheets

RETAINING MEMBER AND WIRE HARNESS

CROSS-REFERENCE TO RELATED APPLICATION (S)

The present application claims priority to and incorporates by reference the entire contents of Japanese Patent Application No. 2022-184646 filed in Japan on Nov. 18, 2022 and Japanese Patent Application No. 2023-115286 filed in Japan on Jul. 13, 2023.

BACKGROUND OF THE INVENTION

1. Field of the Invention

The present invention relates to a retaining member and a wire harness.

2. Description of the Related Art

There is a known configuration of retaining an end of an exterior member for an electric wire. Japanese Patent Application Laid-open No. 2021-19386 discloses a slide door harness including: a wiring member routed across a slide door and a vehicle body; and a vehicle body-side fixing portion provided in the vehicle body and pivotably retaining one end of the wiring member along with sliding movement of the slide door. The vehicle body-side fixing portion includes a pivoting retainer that pivotably retains one end of an exterior material.

When the retaining member that retains the end of the exterior member is formed of a plurality of members, it is desirable to be able to suppress pinching of the electric wire.

SUMMARY OF THE INVENTION

An object of the present invention is to provide a retaining member and a wire harness capable of suppressing pinching of an electric wire between members.

In order to achieve the above mentioned object, a retaining member component according to one aspect of the present invention includes a first member and a second member, the members configured to retain a tip end of an exterior member having a cylindrical shape, wherein the first member and the second member have an engagement structure that engages with each other in a first direction, and the engagement structure engages with each other to form; a retaining structure that retains the tip end, and an opening through which an electric wire inserted into the exterior member is drawn out to an external space, the retaining structure has grooves provided in the first member and the second member, and retains the tip end by sandwiching the tip end between the groove of the first member and the groove of the second member, the first member and the second member are provided with a regulating structure that is disposed adjacent to the opening and regulates pinching of the electric wire in a gap between the first member and the second member, the regulating structure includes; a protrusion that one of the first member and the second member has, and a facing wall that the other of the first member and the second member has, the protrusion and the facing wall face each other in an extending direction of the groove, and the regulating structure is configured such that the protrusion and the facing wall overlap each other when viewed from the extending direction in a state where the first member and the second member are most separated from each other within a range allowed by a clearance of the engagement structure.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a retaining member and a wire harness according to an embodiment of the present invention will be described in detail with reference to the drawings. Note that the present invention is not limited by the embodiment. Moreover, components in the following embodiment include those that are easily conceivable for those skilled in the art or substantially identical.

EMBODIMENT

Figure 1:
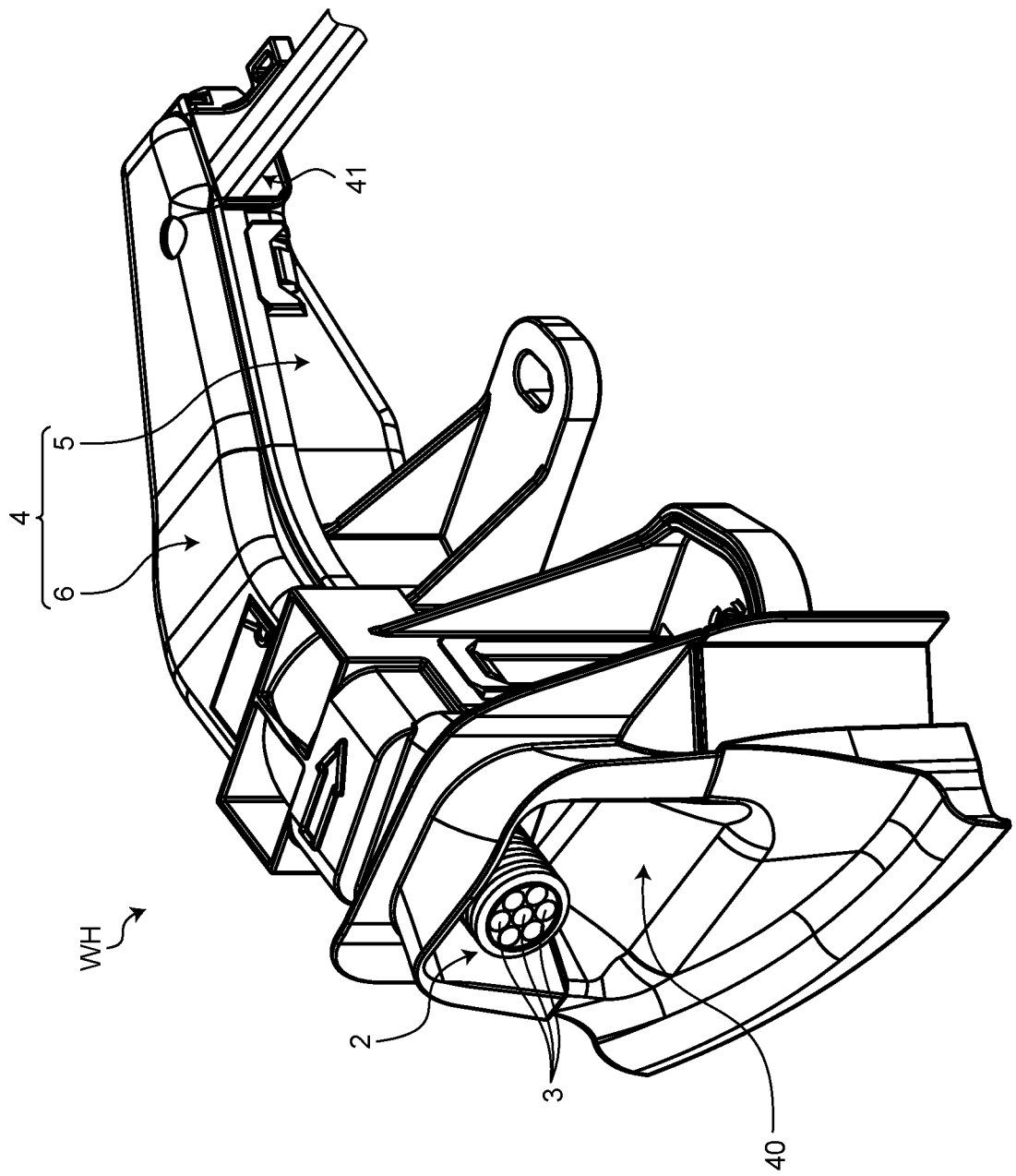
FIG. 1 is a perspective view of a wire harness according to an embodiment.
Figure 2:
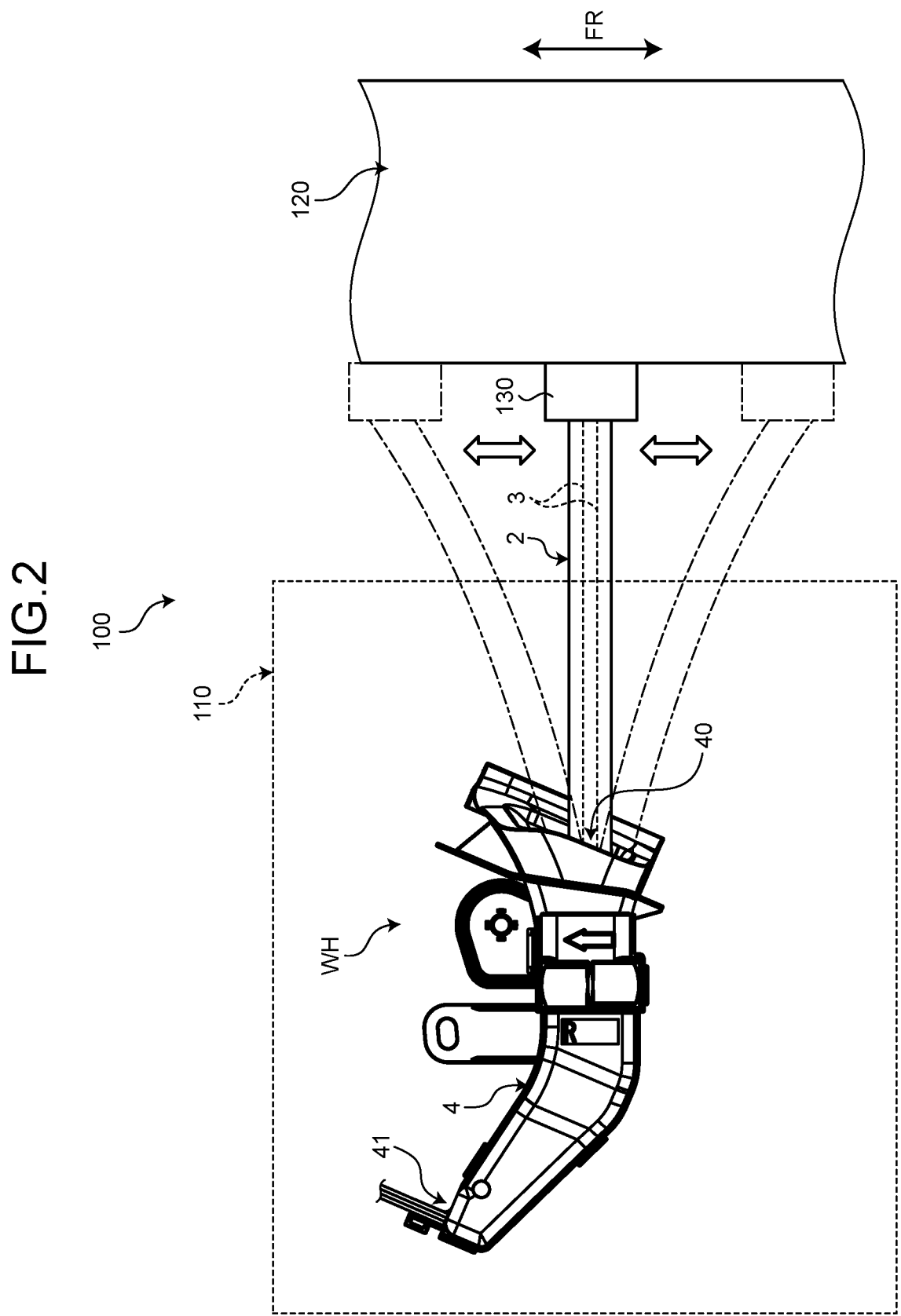
FIG. 2 is a plan view of the wire harness according to the embodiment.
Figure 3:
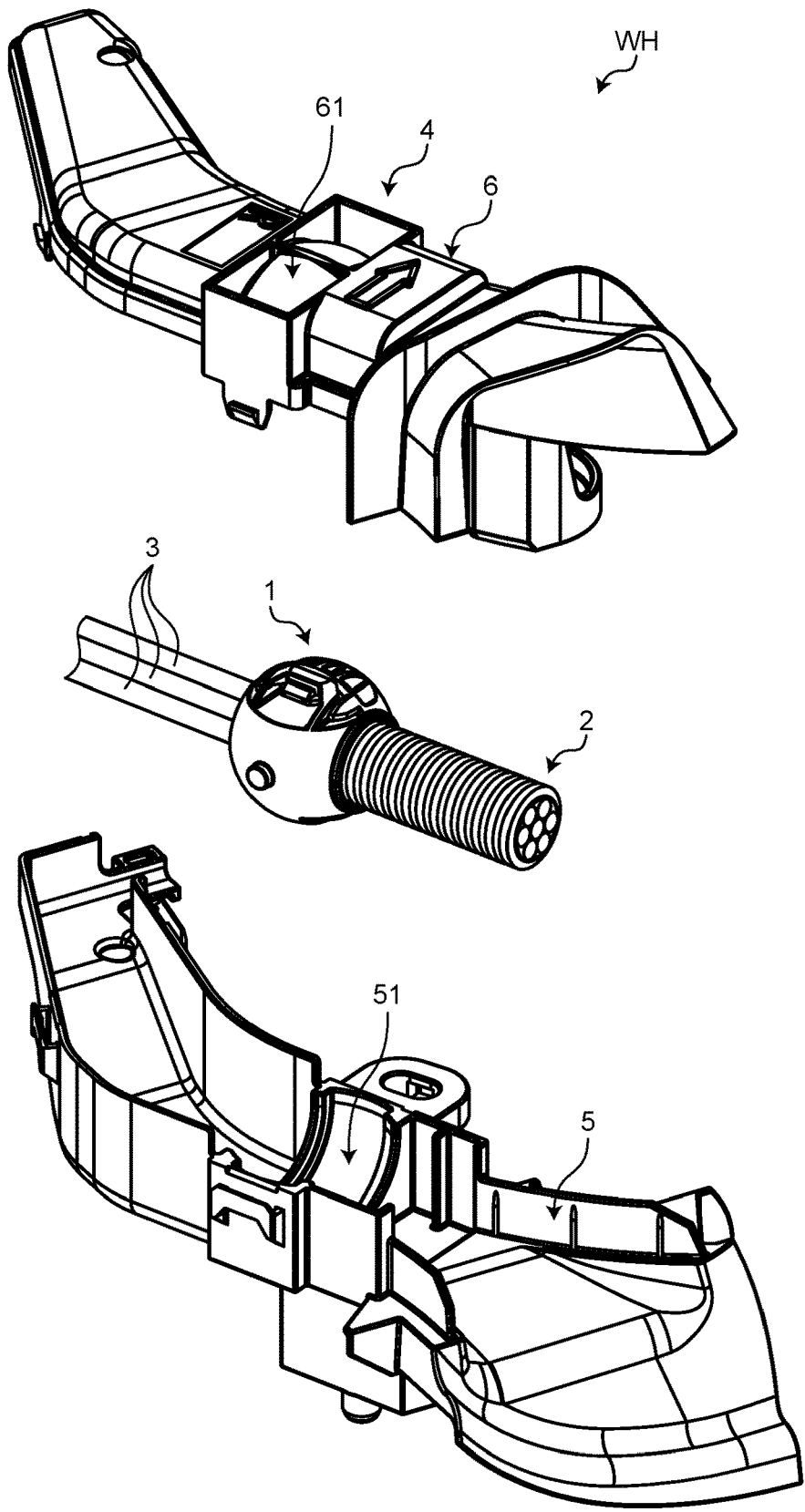
FIG. 3 is an exploded perspective view of the wire harness according to the embodiment.
Figure 4:
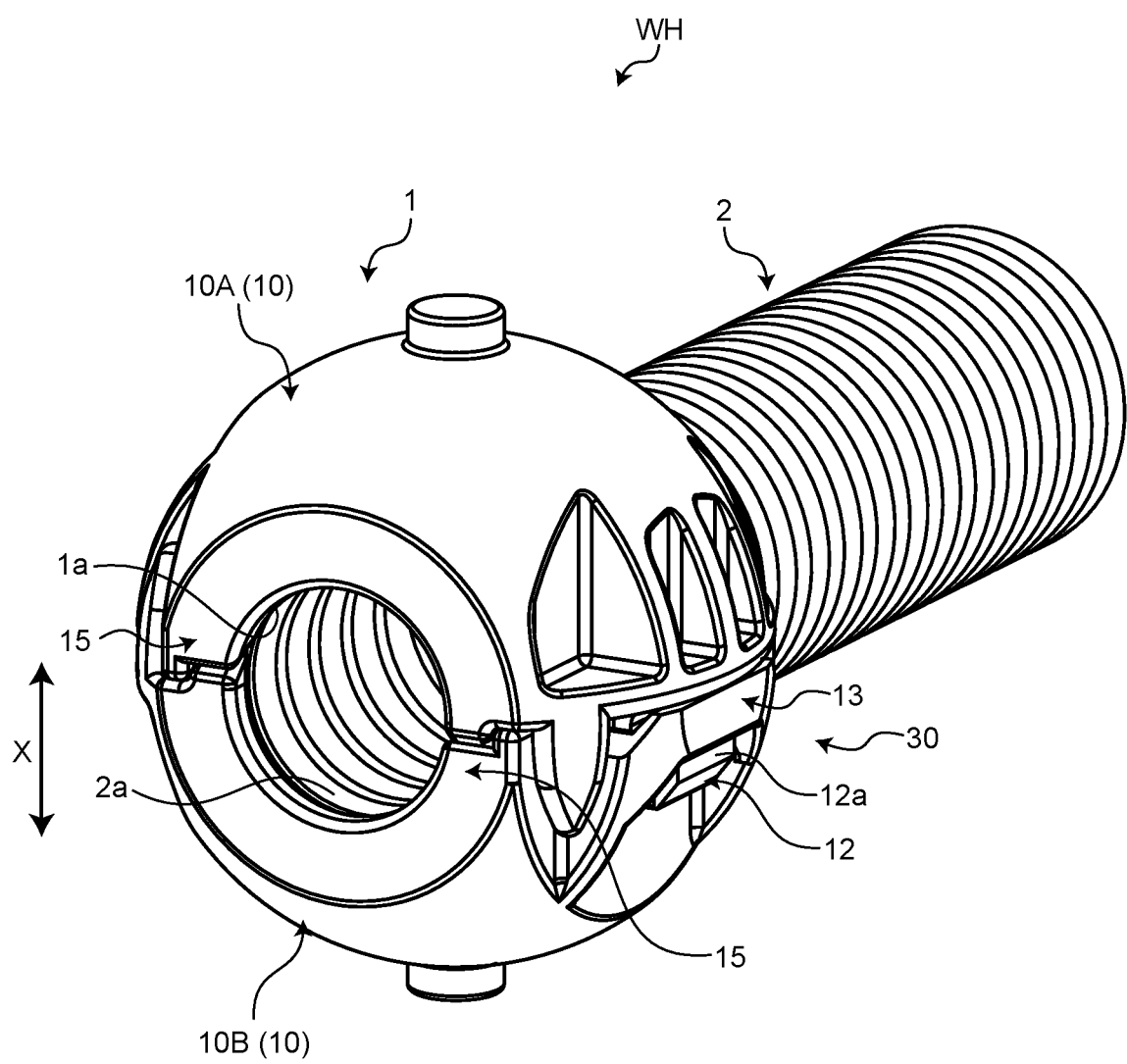
FIG. 4 is a perspective view of a retaining member and an exterior member according to the embodiment.
Figure 5:
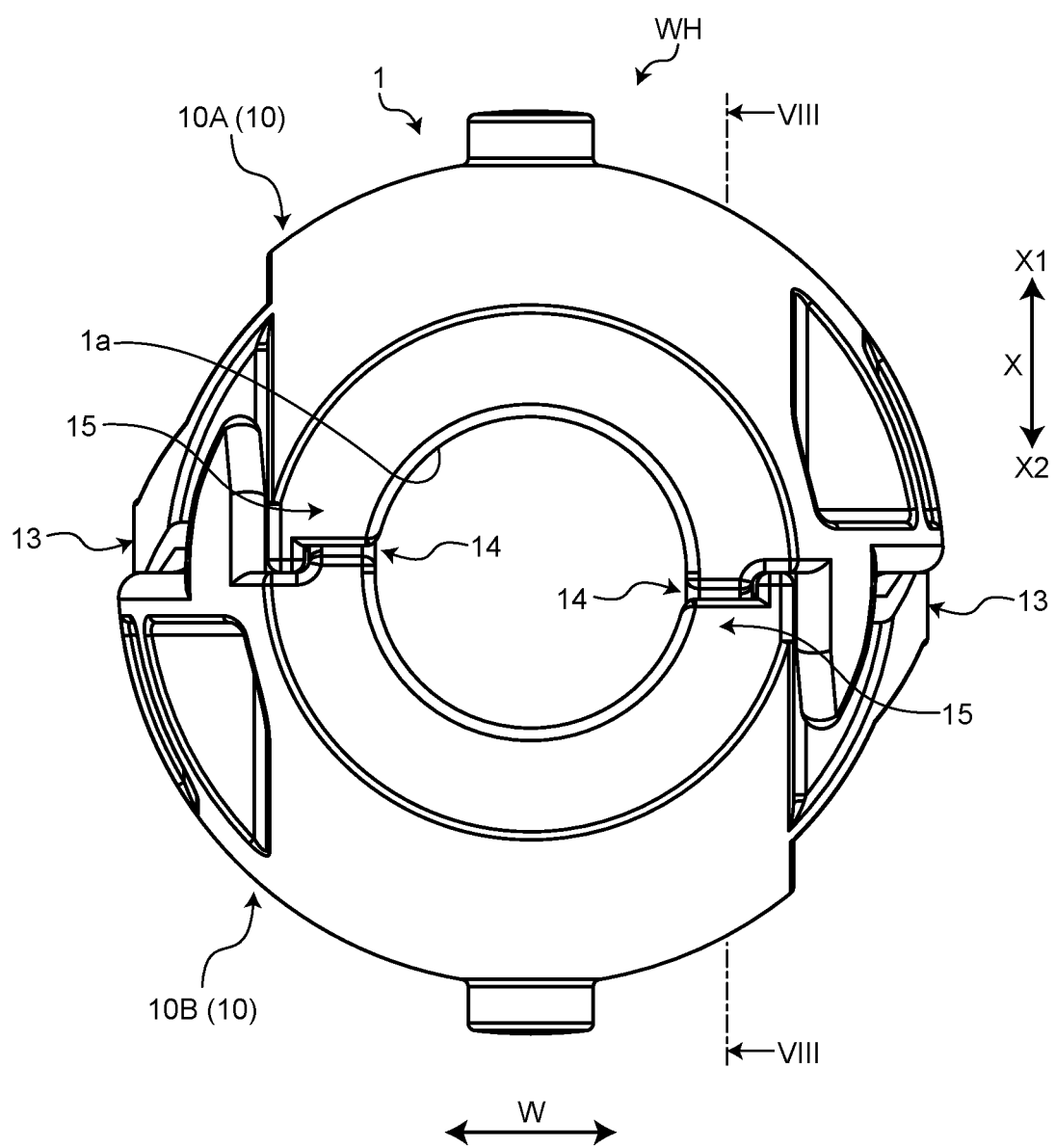
FIG. 5 is a front view of the retaining member according to the embodiment.
Figure 6:
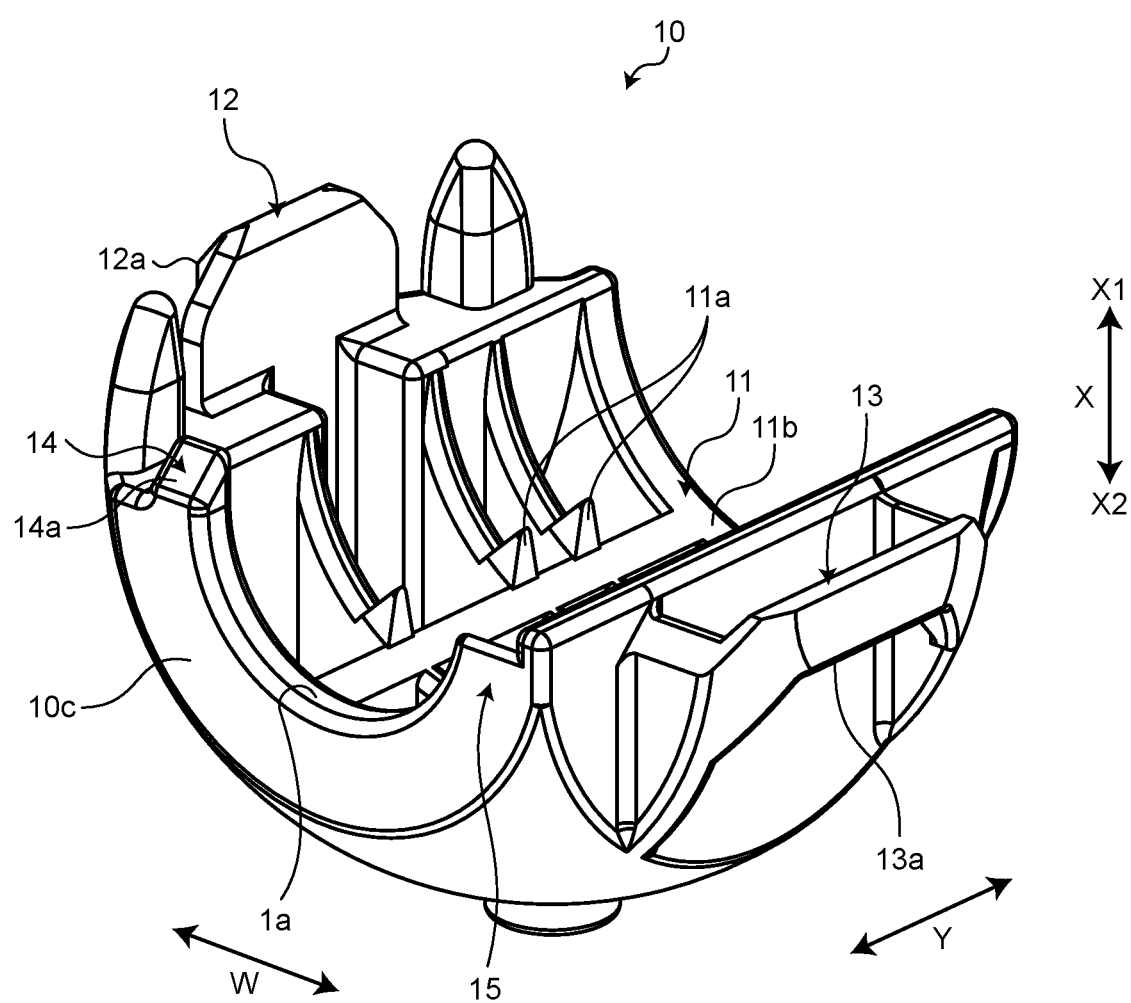
FIG. 6 is a perspective view of an engaging member according to the embodiment.
Figure 7:
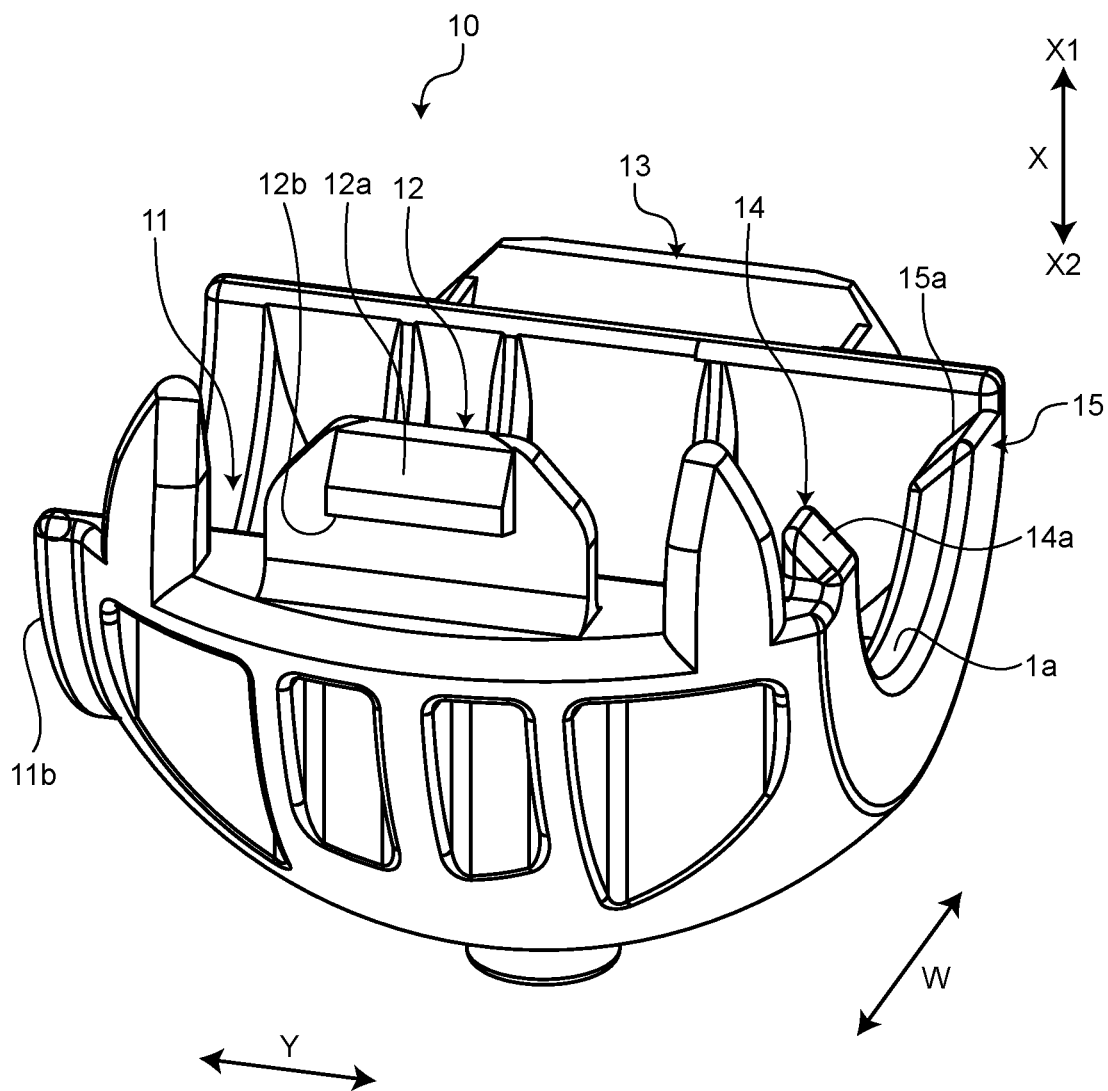
FIG. 7 is a perspective view of the engaging member according to the embodiment.
Figure 8:
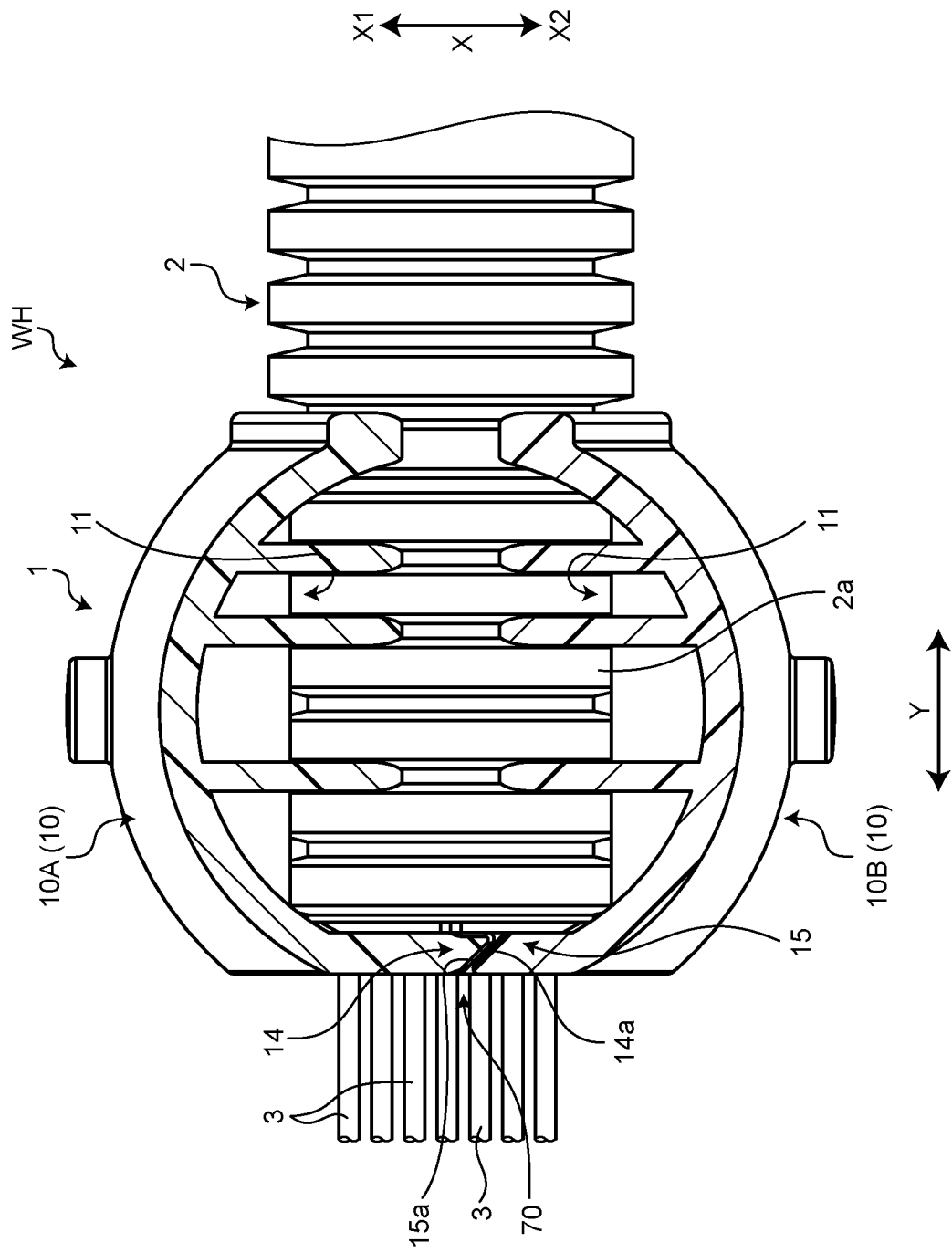
FIG. 8 is a cross-sectional view of the retaining member according to the embodiment.
Figure 9:
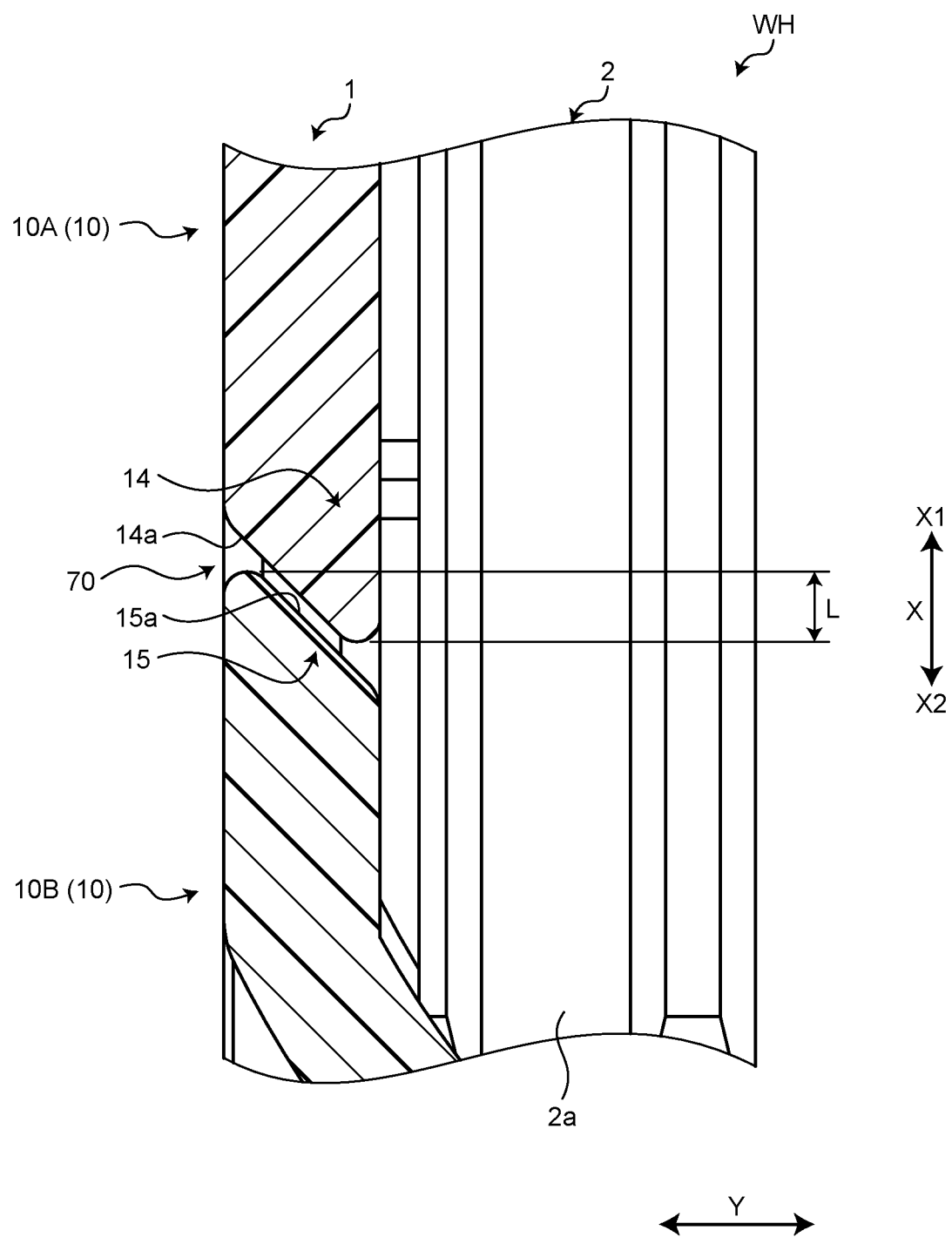
FIG. 9 is a cross-sectional view of the retaining member according to the embodiment.

An embodiment will be described with reference to FIGS. 1 to 9. The present embodiment relates to a retaining member and a wire harness. FIG. 1 is a perspective view of a wire harness according to the embodiment, FIG. 2 is a plan view of the wire harness according to the embodiment, FIG. 3 is an exploded perspective view of the wire harness according to the embodiment, FIG. 4 is a perspective view of a retaining member and an exterior member according to the embodiment, FIG. 5 is a front view of the retaining member according to the embodiment, FIGS. 6 and 7 are perspective views of an engaging member according to the embodiment, FIG. 8 is a cross-sectional view of the retaining member according to the embodiment, and FIG. 9 is a cross-sectional view of the retaining member according to the embodiment. FIG. 8 illustrates a cross section taken along line VIII-VIII of FIG. 5.

As illustrated in FIGS. 1 to 3, a wire harness WH of the present embodiment includes a retaining member 1, an exterior member 2, an electric wire 3, and a protector 4. As illustrated in FIG. 2, the protector 4 is fixed to a vehicle body 110 of a vehicle 100. The protector 4 has a door-side opening 40 and a vehicle body-side opening 41. The door-side opening 40 is an opening through which the exterior member 2 is drawn out toward a slide door 120. As illustrated in FIG. 2, the end of the exterior member 2 pulled out from the protector 4 is retained by a door-side protector 130. The door-side protector 130 is a protector disposed on the slide door 120, and moves in a vehicle front-rear direction FR together with the slide door 120.

The door-side opening 40 has a shape having a cross-sectional area increasing from the inside of the protector 4 toward an outlet so that the exterior member 2 can follow the motion of the slide door 120. The exterior member 2 is a member into which a plurality of the electric wire 3 are inserted. The electric wire 3 is connected to devices of the slide door 120 via the door-side protector 130. The vehicle body-side opening 41 is an opening through which the electric wire 3 is drawn out. The electric wire 3 drawn out from the vehicle body-side opening 41 is connected to a control device and a power supply mounted on the vehicle body 110.

As illustrated in FIG. 3, the protector 4 includes a lower cover 5 and an upper cover 6. The lower cover 5 includes a support 51 that supports the retaining member 1. The support 51 rotatably supports the retaining member 1 by a pair of arc-shaped ribs. The upper cover 6 includes a support 61 corresponding to the support 51. The support 61 rotatably supports the retaining member 1 by a pair of arc-shaped ribs. The lower cover 5 and the upper cover 6 are engaged with each other to form a housing space that houses the retaining member 1.

FIGS. 4 and 5 illustrate the retaining member 1 that retains the exterior member 2. For example, the electric wire 3 is inserted into the exterior member 2 retained by the retaining member 1. The retaining member 1 may be attached to the exterior member 2 after the electric wire 3 is inserted into the exterior member 2.

As illustrated in FIGS. 4 and 5, the retaining member 1 has a substantially spherical shape. As illustrated in FIG. 4, the retaining member 1 retains a tip end 2a of the exterior member 2. The retaining member 1 includes a first member 10A and a second member 10B. In the present embodiment, the first member 10A and the second member 10B are engaging members 10 having a same shape. That is, the retaining member 1 of the present embodiment is formed by combining two engaging members 10 having the same shape. The first member 10A and the second member 10B have an engagement structure 30 that engages with each other in a first direction X. The first member 10A and the second member 10B illustrated as an example are engaged by two sets of engagement structures 30.

The retaining member 1 has an opening 1a through which the electric wire 3 is drawn out. The opening 1a illustrated as an example has a circular shape. The opening 1a is formed by a semicircular recess provided at the end of the first member 10A and the second member 10B.

The exterior member 2 is a cylindrical member having flexibility. The exterior member 2 of the present embodiment is a flexible bellows-shaped member referred to as a corrugated tube. The exterior member 2 has annular protrusions and annular grooves alternately arranged in an axial direction of the exterior member 2. The exterior member 2 is molded from an insulating synthetic resin.

As illustrated in FIG. 6, the engaging member 10 has a groove 11 extending in a straight line. In the present specification, the direction in which the groove 11 extends is referred to as an extending direction Y. The extending direction Y is orthogonal to the first direction X. A direction orthogonal to each of the first direction X and the extending direction Y is referred to as a width direction W.

The groove 11 extends from one end to the other end of the engaging member 10 in the extending direction Y. The cross-sectional shape of the groove 11 in the cross section orthogonal to the extending direction Y is a semicircular shape. The central axis of the groove 11 is aligned with the central axis of the retaining member 1. The groove 11 has a plurality of projections 11a locking the exterior member 2. The projection 11a enters an annular groove of the exterior member 2 to lock the exterior member 2. The groove 11 has an outlet 11b through which the exterior member 2 is drawn out. The outlet 11b is an end of the groove 11 on the side opposite to the opening 1a.

The engaging member 10 includes an engaging piece 12 and a locking portion 13. The engaging piece 12 and the locking portion 13 constitute the engagement structure 30 that engages in the first direction X. The engaging piece 12 is disposed on one side in the width direction W with respect to the groove 11, while the locking portion 13 is disposed on the other side in the width direction W with respect to the groove 11. That is, the engaging piece 12 and the locking portion 13 face each other in the width direction W across the grooves 11. The engaging piece 12 is formed in a flat plate shape and protrudes in the first direction X. As illustrated in FIG. 7, the engaging piece 12 has a claw portion 12a. The claw portion 12a is disposed at a distal end of the engaging piece 12 and protrudes in the width direction W. The claw portion 12a has a contact surface 12b locked by the locking portion 13.

The locking portion 13 protrudes in the width direction W and has a frame shape into which the engaging piece 12 is inserted. The engaging piece 12 is inserted into the locking portion 13 in the first direction X. The locking portion 13 has a locking surface 13a that locks the claw portion 12a.

The engaging member 10 has a protrusion 14 and a facing wall 15. The protrusion 14 and the facing wall 15 constitute a regulating structure that regulates pinching of the electric wire 3. The protrusion 14 and the facing wall 15 are disposed at an end on the opening 1a side in the extending direction Y. The protrusion 14 and the facing wall 15 are disposed adjacent to the opening 1a. More specifically, the protrusion 14 is disposed on one side in the width direction W with respect to the opening 1a, while the facing wall 15 is disposed on the other side in the width direction W with respect to the opening 1a. The positions of the protrusion 14 and the facing wall 15 are the positions of mating surfaces when the two engaging members 10 are combined with each other. The protrusion 14 and the facing wall 15 face each other in the width direction W across the central axis of the opening 1a.

The engaging member 10 has an end surface 10c having an arc shape and surrounding the opening 1a. An arc-shaped wall including the end surface 10c is a partition wall that partitions the groove 11 and an external space from each other. The wall faces the end surface of the exterior member 2 in the extending direction Y. The protrusion 14 is provided at one end of the end surface 10c, and the facing wall 15 is provided at the other end of the end surface 10c.

The protrusion 14 protrudes toward one side X1 in the first direction X. The protrusion 14 when viewed from the extending direction Y has a rectangular shape. The protrusion 14 has a tapered shape in which the width in the extending direction Y decreases toward the one side X1 in the first direction X. The protrusion 14 has a facing surface 14a. The facing surface 14a is a surface facing the side opposite to the groove 11. In other words, the facing surface 14a is a surface of the protrusion 14 facing the external space. The facing surface 14a is an inclined surface inclined with respect to the first direction X. More specifically, the facing surface 14a is inclined with respect to the first direction X so as to approach the groove 11 toward the distal end of the protrusion 14.

As illustrated in FIG. 7, the facing wall 15 is an end of a wall having an end surface 10c. The facing wall 15 has a tapered shape in which the width in the extending direction Y decreases toward the one side X1 in the first direction X. The facing wall 15 has a facing surface 15a. The facing surface 15a is a surface facing the groove 11. In other words, the facing surface 15a is a surface of the facing wall 15 facing an internal space. The facing surface 15a is an inclined surface inclined with respect to the first direction X. More specifically, the facing surface 15a is inclined with respect to the first direction X so as to be away from the groove 11 toward one side X1 of the first direction X. The inclination angle of the facing surface 15a with respect to the first direction X is equal to the inclination angle of the facing surface 14a with respect to the first direction X.

FIG. 8 illustrates a cross section of the retaining member 1. The tip end 2a of the exterior member 2 is sandwiched and retained between the groove 11 of the first member 10A and the groove 11 of the second member 10B. The end surface of the exterior member 2 is located in the vicinity of the protrusion 14 and the facing wall 15. The electric wire 3 inserted into the exterior member 2 is drawn out from the opening 1a of the retaining member 1. The drawn electric wire 3 is routed toward the vehicle body-side opening 41 of the protector 4.

As described below, the retaining member 1 of the present embodiment has a regulating structure that regulates the pinching of the electric wire 3 in the gap between the first member 10A and the second member 10B. The regulating structure of the present embodiment constitutes of the protrusion 14 and the facing wall 15. FIG. 8 illustrates the first member 10A and the second member 10B which are engaged with each other to retain the exterior member 2. The protrusion 14 and the facing wall 15 face each other in the extending direction Y of the groove 11. That is, the engaging member 10 is formed such that the protrusion 14 and the facing wall 15 face each other in the extending direction Y by engaging the engaging piece 12 and the locking portion 13 with each other. Accordingly, the protrusion 14 and the facing wall 15 overlap each other when viewed from the extending direction Y. Such a configuration regulates the pinching of the electric wire 3 in the gap between the first member 10A and the second member 10B.

Here is a comparative example to be discussed, in which a retaining member has no protrusion 14 and the facing wall 15, and in which a mating surface between the first member and the second member is parallel to the extending direction Y. The retaining member of the comparative example has a configuration in which the extending direction of the electric wire 3 is parallel to the mating surface, and thus, the electric wire 3 is more likely to enter the gap between the first member and the second member. In contrast, the retaining member 1 of the present embodiment has a configuration in which the protrusion 14 and the facing wall 15 face each other in the extending direction Y. This makes it possible for the protrusion 14 and the facing wall 15 to regulate the entry of the electric wire 3 into the gap.

FIG. 9 is an enlarged view of the protrusion 14 and the facing wall 15. The protrusion 14 and the facing wall 15 face each other in the extending direction Y to constitute a regulating structure 70. In the regulating structure 70 illustrated in FIG. 9, the facing surface 15a of the facing wall 15 faces one side X1 in the first direction X, while the facing surface 14a of the protrusion 14 faces the other side X2 in the first direction X.

FIG. 9 illustrates an overlapping width L of the protrusion 14 and the facing wall 15. The overlapping width L is a distance from the distal end of the facing wall 15 to the distal end of the protrusion 14 in the first direction X. In other words, the overlapping width L is a length in the first direction X of a portion where the protrusion 14 and the facing wall 15 overlap each other when viewed from the extending direction Y. The overlapping width L varies depending on the relative position between the first member 10A and the second member 10B. The engagement structure 30, which is constituted with the engaging piece 12 and the locking portion 13, has a clearance. Due to this clearance, the first member 10A and the second member 10B are allowed to relatively move in the first direction X.

FIG. 9 illustrates a state in which the first member 10A and the second member 10B are most separated in the first direction X. In this case, a slight gap occurs between the two facing surfaces 14a and 15a. The retaining member 1 of the present embodiment has a configuration in which the protrusion 14 and the facing wall 15 overlap each other when viewed from the extending direction Y in a state where the first member 10A and the second member 10B are most separated. In other words, the retaining member 1 of the present embodiment is configured such that the value of the overlapping width L is greater than 0 in a state where the first member 10A and the second member 10B are most separated from each other. A specific example of this configuration is as follows.

The value of the overlapping width L when the first member 10A and the second member 10B are closest to each other is set as a maximum value Lmax. The maximum value Lmax is determined to satisfy the following formula (1). In Expression (1), a clearance dimension Xt is the size of the clearance in the first direction X in the engagement structure 30 constituted with the engaging piece 12 and the locking portion 13. With this, even when the first member 10A and the second member 10B are most separated from each other, the overlapping width L has a positive value. This makes it possible for the regulating structure 70 of the present embodiment to regulate the biting of the electric wire 3.

$$Lmax > Xt \tag{1}$$

A minimum value Lmin, which is the value of the overlapping width L when the first member 10A and the second member 10B are separated the most, may be determined according to the outer diameter of the electric wire 3. For example, the minimum value Lmin may be equal to or larger than the outer diameter of the electric wire 3. When the plurality of electric wires 3 having different thicknesses are inserted into the exterior member 2, the minimum value Lmin may be determined according to the minimum diameter of the electric wire 3.

The regulating structure 70 of the present embodiment can mainly regulate the biting of the electric wire 3 in the following two scenes.

The following will describe, as a first scene, a case where the electric wire 3 is inserted into the exterior member 2 and the retaining member 1 in a state where the retaining member 1 retains the exterior member 2. In this case, even when the electric wire 3 is about to enter the gap between the first member 10A and the second member 10B in the opening 1a, the protrusion 14 and the facing wall 15 would block the entry of the electric wire 3. That is, the protrusion 14 and the facing wall 15 would constitute a guard wall for the electric wire 3 so as to prevent the electric wire 3 from protruding outward in the radial direction from the opening 1a. In the retaining member 1 of the present embodiment, the distance between the two facing surfaces 14a and 15a is determined to prevent the electric wire 3 from easily entering between the facing surfaces 14a and 15a. For example, the maximum value of the distance between the two facing surfaces 14a and 15a is smaller than the outer diameter of the electric wire 3.

Now, the following will describe, as a second scene, a case where the retaining member 1 is attached to the exterior member 2 after the electric wire 3 is inserted into the exterior member 2. When a worker tries to engage the first member 10A and the second member 10B with the electric wire 3 pinched between the protrusion 14 and the facing wall 15, the protrusion 14 and the facing wall 15 are going to bend the electric wire 3. In this case, a reaction force due to the rigidity of the electric wire 3 acts on the protrusion 14 and the facing wall 15. Due to the need to use a larger engaging force than usual, the worker can easily notice the biting of the electric wire 3.

Furthermore, in the retaining member 1 of the present embodiment, when the electric wire 3 enters the gap between the first member 10A and the second member 10B, the engaging piece 12 and the locking portion 13 cannot be engaged with each other. For example, a distance between the two facing surfaces 14a and 15a is set as a means of disabling engagement of the engagement structure 30. In this case, the protrusion 14 and the facing wall 15 are configured to suppress insertion of the engaging piece 12 up to the engagement position with respect to the locking portion 13 in a state where the electric wire 3 is pinched between the two facing surfaces 14a and 15a.

In this manner, when the electric wire 3 is inserted through the exterior member 2 and the opening 1a of the retaining member 1, the retaining member 1 of the present embodiment can regulate the electric wire 3 from entering the gap between the first member 10A and the second member 10B. In addition, when the electric wire 3 is inserted through the exterior member 2 in advance, the retaining member 1 disables engagement between the first member 10A and the second member 10B in a state where the electric wire 3 is pinched. Therefore, the retaining member 1 of the present embodiment can regulate the electric wire 3 from entering the gap between the first member 10A and the second member 10B in any of two assembling steps.

In addition, in the retaining member 1 of the present embodiment, the two facing surfaces 14a and 15a face each other in the extending direction Y. The two facing surfaces 14a and 15a are inclined surfaces inclined with respect to each of the first direction X and the extending direction Y. Since the facing surfaces 14a and 15a are inclined with respect to the first direction X, even when the first member 10A and the second member 10B relatively move in the first direction X, a large gap is less likely to occur between the facing surfaces 14a and 15a. Therefore, the protrusion 14 and the facing wall 15 can appropriately suppress entry of the electric wire 3 into the gap between the first member 10A and the second member 10B.

As described above, the retaining member 1 of the present embodiment includes the first member 10A and the second member 10B that retain the tip end 2a of the cylindrical exterior member 2. The first member 10A and the second member 10B have an engagement structure 30 that engages with each other in the first direction X, and the engagement of the engagement structure 30 forms a retaining structure and the opening 1a. The retaining structure is a structure of retaining the tip end 2a of the exterior member 2. The opening 1a is a portion through which the electric wire 3 inserted into the exterior member 2 is drawn out from the retaining member 1 to the external space.

The retaining structure has the groove 11 provided in the first member 10A and the second member 10B, and retains the tip end 2a by sandwiching the tip end 2a between the groove 11 of the first member 10A and the groove 11 of the second member 10B. The first member 10A and the second member 10B are provided with the regulating structure 70 disposed adjacent to the opening 1a. The regulating structure 70 regulates the pinching of the electric wire 3 in the gap between the first member 10A and the second member 10B.

The regulating structure 70 includes: the protrusion 14 provided on one of the first member 10A and the second member 10B; and the facing wall 15 provided on the other of the first member 10A and the second member 10B. The protrusion 14 and the facing wall 15 face each other in the extending direction Y of the groove 11. The regulating structure 70 is configured such that the protrusion 14 and the facing wall 15 overlap each other when viewed from the extending direction Y in a state where the first member 10A and the second member 10B are most separated from each other within a range allowed by the clearance of the engagement structure 30. This makes it possible for the retaining member 1 of the present embodiment to suppress the entry of the electric wire 3 between the first member 10A and the second member 10B.

The wire harness WH of the present embodiment includes the cylindrical exterior member 2, the electric wire 3 inserted into the exterior member 2, the retaining member 1, and the protector 4 that rotatably supports the retaining member 1. The wire harness WH of the present embodiment can prevent a failure caused by the electric wire 3 being pinched by the retaining member 1. For example, the regulating structure 70 can suppress the occurrence of pinching of the electric wire 3 at rotational operation of the retaining member 1.

First Modification of Embodiment

Figure 10:
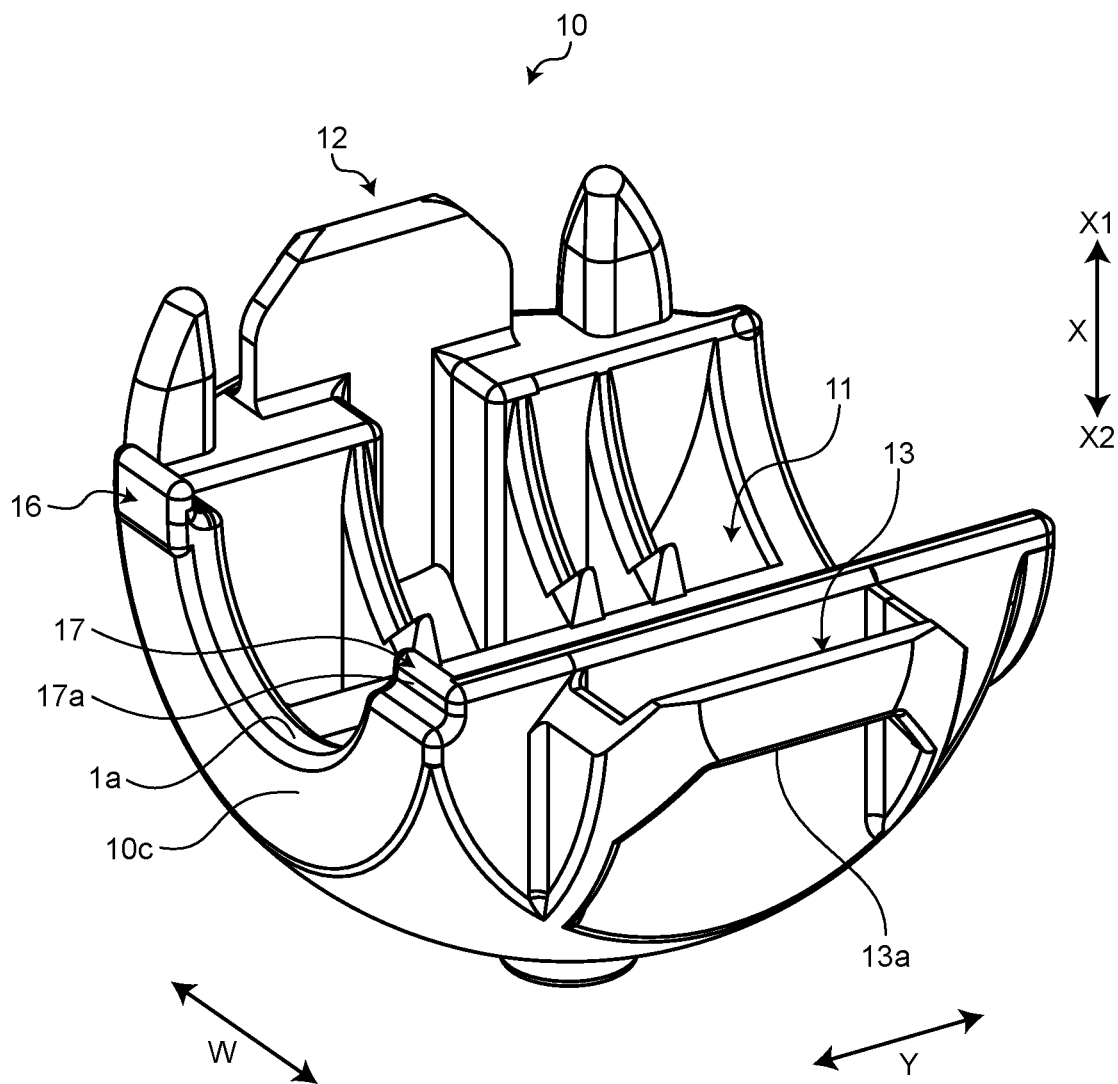
FIG. 10 is a perspective view of an engaging member according to a first modification of the embodiment.
Figure 11:
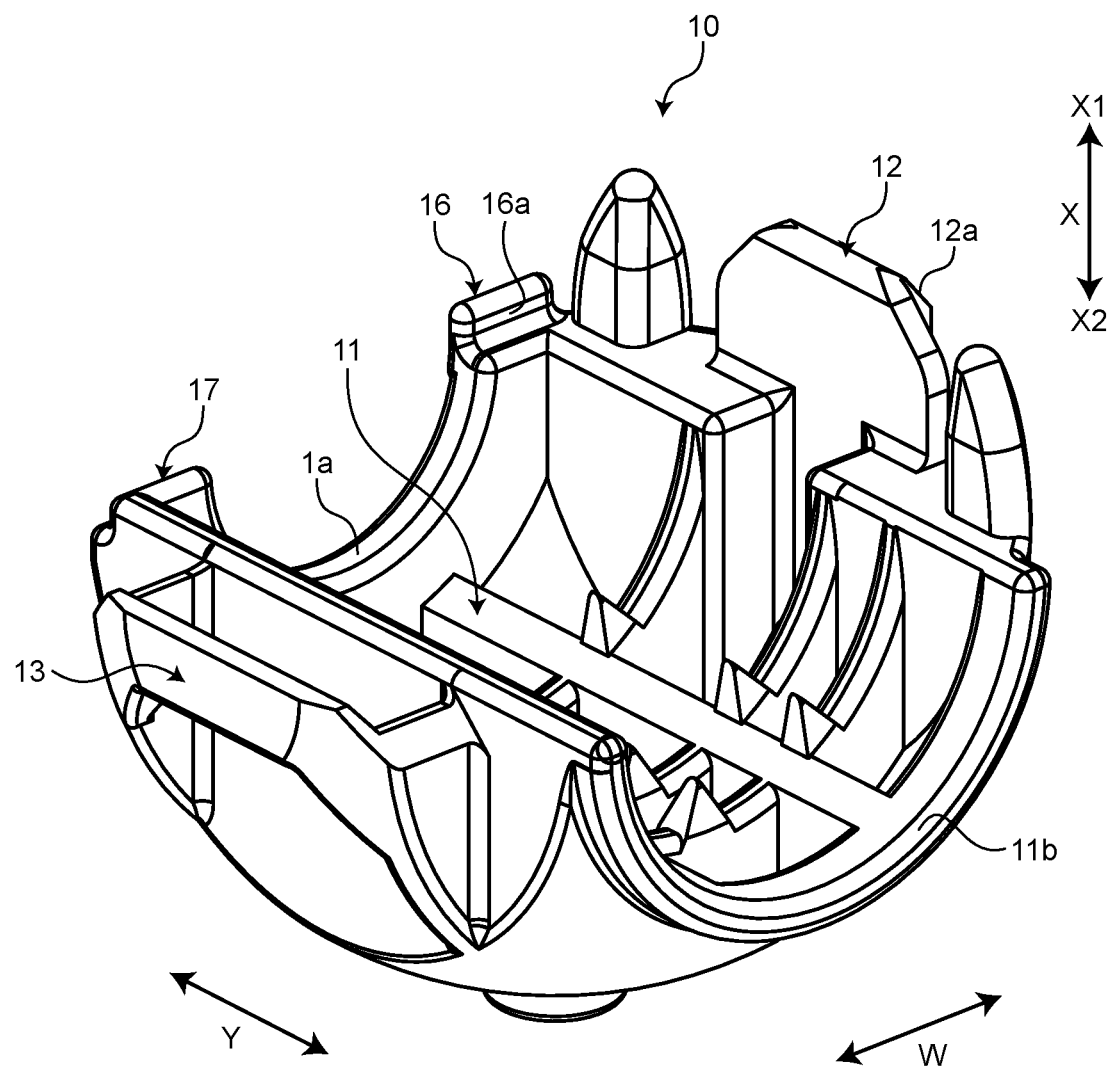
FIG. 11 is a perspective view of the engaging member according to the first modification of the embodiment.
Figure 12:
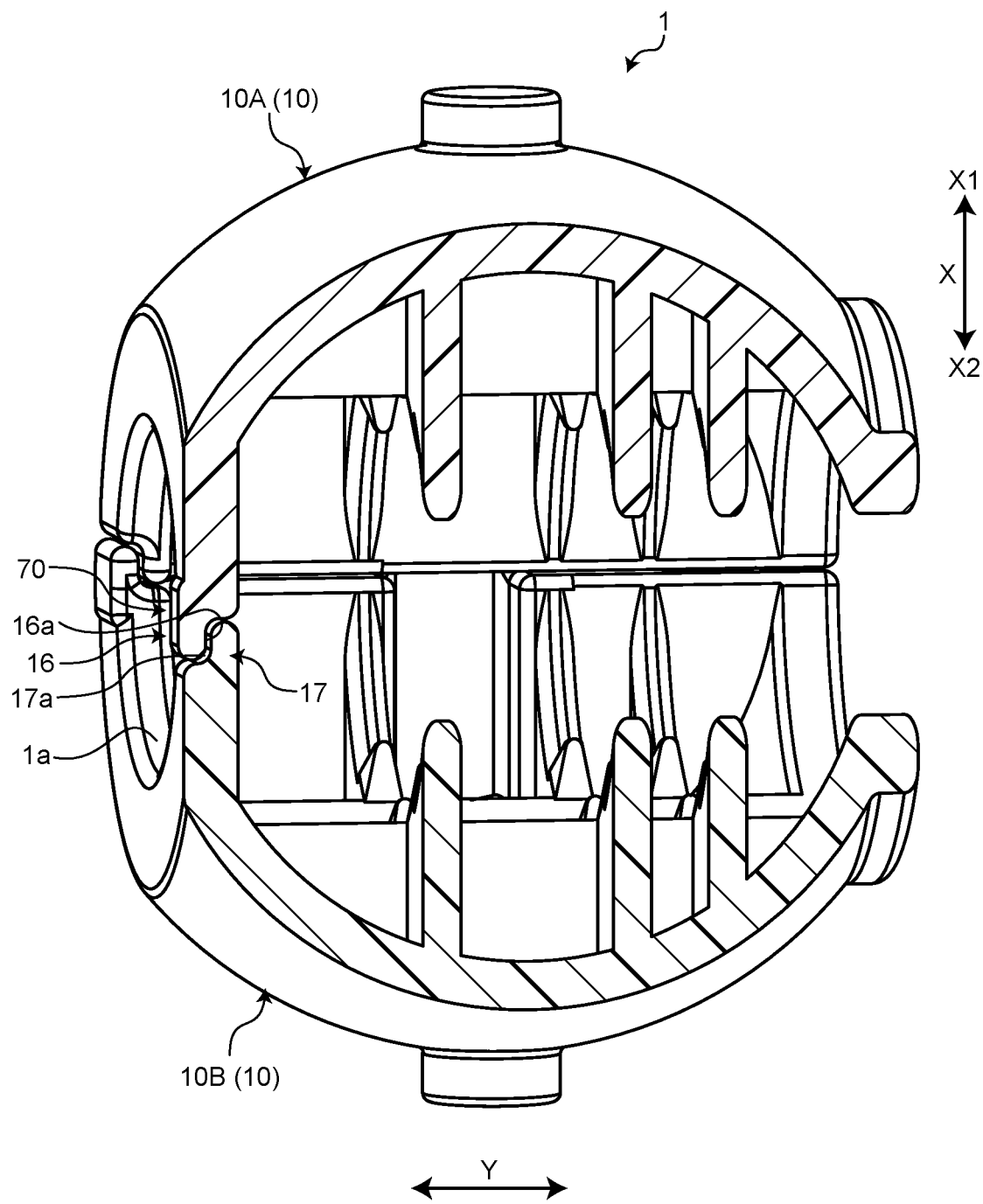
FIG. 12 is a cross-sectional view of a retaining member according to the first modification of the embodiment.

A first modification of the embodiment will be described. FIGS. 10 and 11 are perspective views of a engaging member according to the first modification of the embodiment, and FIG. 12 is a cross-sectional view of a retaining member according to the first modification of the embodiment. The retaining member 1 according to the first modification of the embodiment is different from the retaining member 1 of the above embodiment in the shapes of the protrusion and the facing wall, for example.

As illustrated in FIGS. 10 and 11, the engaging member 10 according to the first modification of the embodiment includes a groove 11, an engaging piece 12, and a locking portion 13 similar to those in the engaging member 10 of the above embodiment. The engaging member 10 according to the first modification includes a protrusion 16 and a facing wall 17. The protrusion 16 is provided at a position similar to the protrusion 14 of the above embodiment, while the facing wall 17 is provided at a position similar to the facing wall 15 of the above embodiment. Accordingly, the protrusion 16 and the facing wall 17 are disposed adjacent to the opening 1a and face each other across the central axis of the opening 1a.

As illustrated in FIG. 10, the protrusion 16 protrudes toward one side X1 in the first direction X. The protrusion 16 when viewed from the extending direction Y has a rectangular shape. The protrusion 16 has a substantially flat plate shape. The facing wall 17 is formed so as to provide a recess corresponding to the protrusion 16 with respect to the wall having the end surface 10c. The facing wall 17 has a facing surface 17a. The facing surface 17a faces the side opposite to the groove 11. The facing surface 17a is parallel to the first direction X and orthogonal to the extending direction Y.

As illustrated in FIG. 11, the protrusion 16 has a facing surface 16a. The facing surface 16a faces the groove 11. The facing surface 16a is parallel to the first direction X and orthogonal to the extending direction Y.

FIG. 12 illustrates a cross section of the retaining member 1 according to the first modification. Note that illustration of the exterior member 2 is omitted. In the retaining member 1 of FIG. 12, the first member 10A and the second member 10B are most separated within a range allowed by the clearance of the engagement structure 30. The protrusion 16 and the facing wall 17 face each other in the extending direction Y. More specifically, the facing surface 16a of the protrusion 16 and the facing surface 17a of the facing wall 17 face each other. The distance between the two facing surfaces 16a and 17a is determined to be able to regulate the entry of the electric wire 3. In the retaining member 1 of the first modification, the two facing surfaces 16a and 17a are surfaces parallel to the first direction X. In this case, even when the first member 10A and the second member 10B relatively move in the first direction X, the distance between the two facing surfaces 16a and 17a would not increase. Therefore, the protrusion 16 and the facing wall 17 of the first modification can appropriately suppress the entry of the electric wire 3 into the gap between the first member 10A and the second member 10B.

Second Modification of Embodiment

Figure 13:
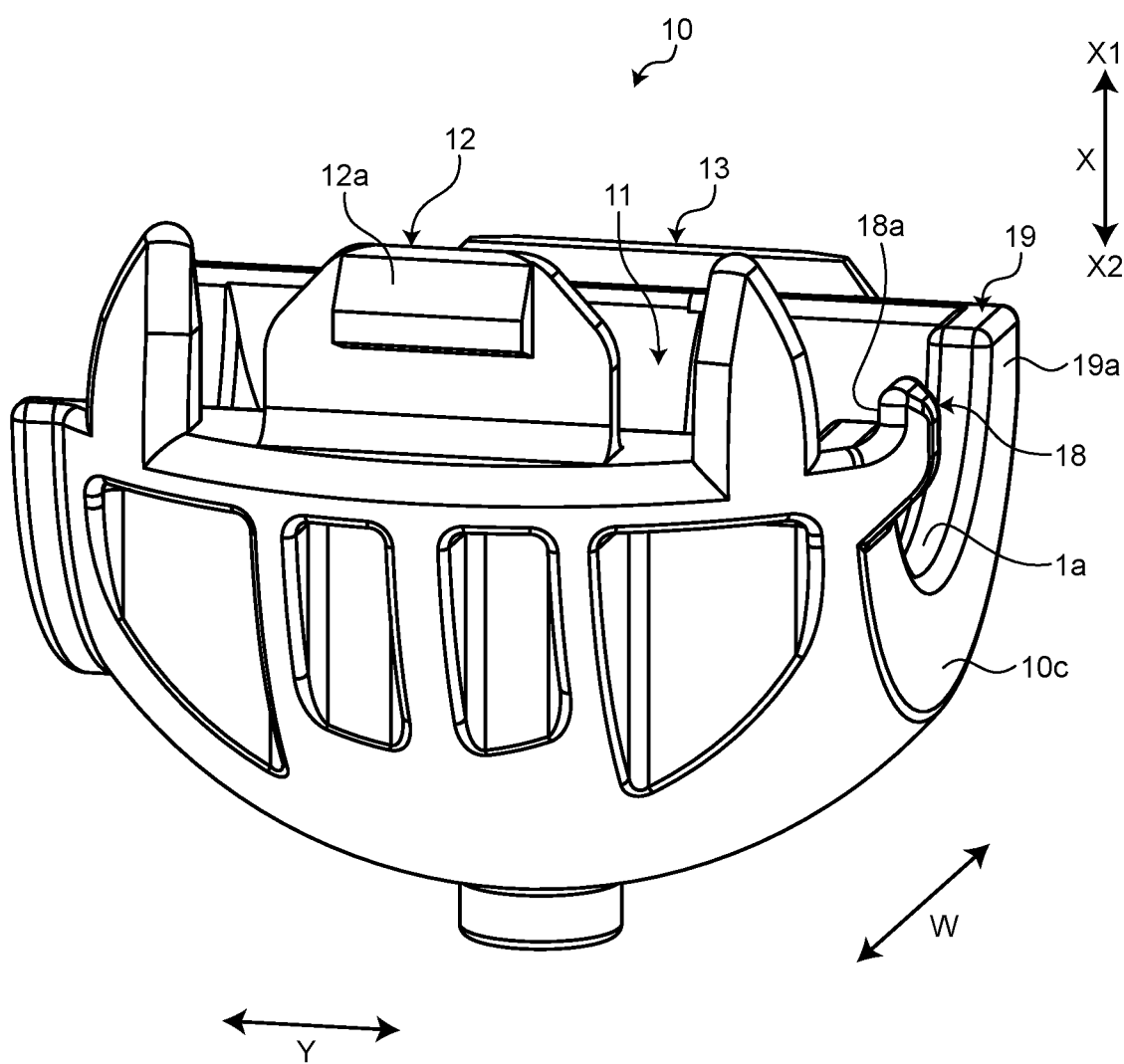
FIG. 13 is a perspective view of an engaging member according to a second modification of the embodiment.
Figure 14:
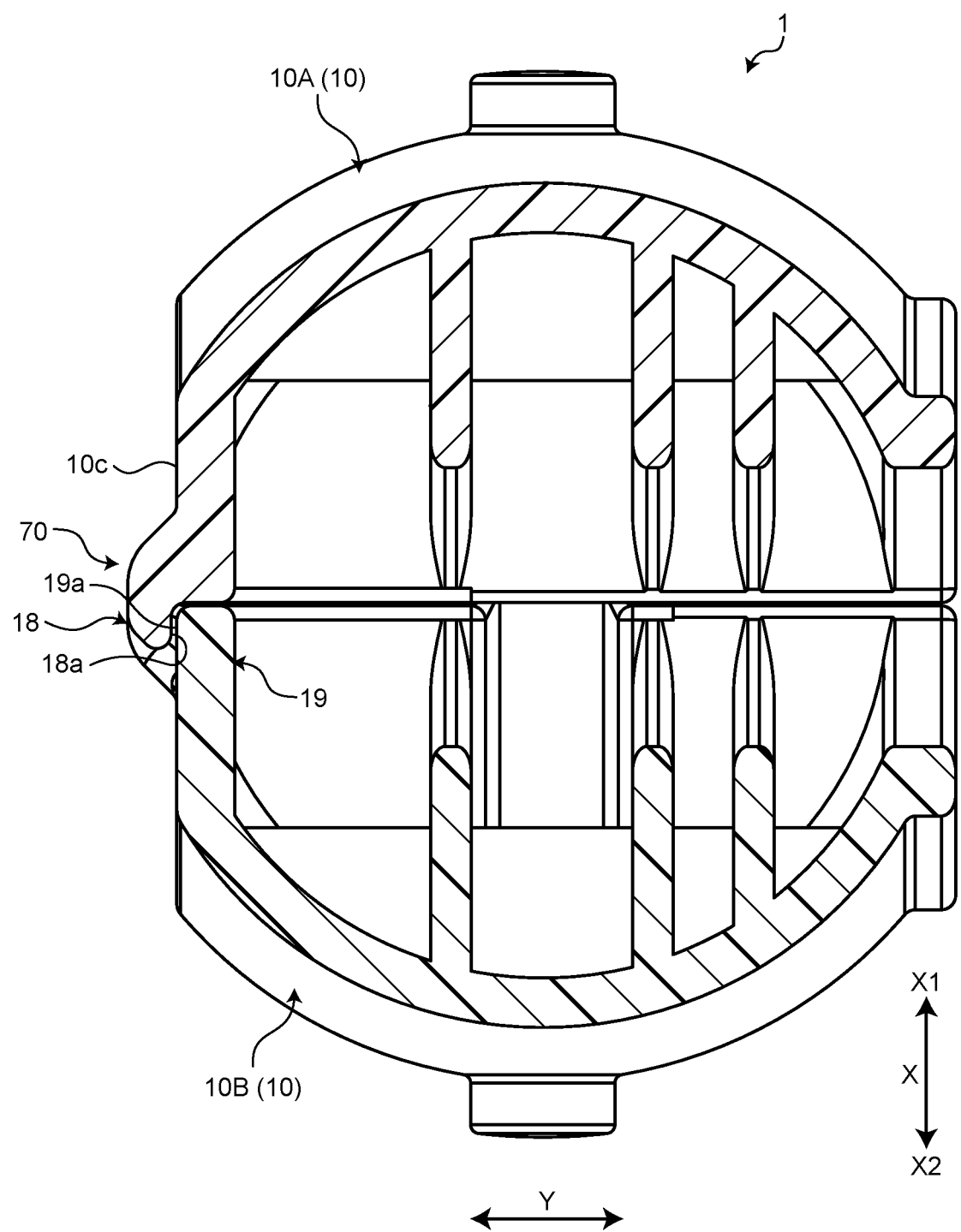
FIG. 14 is a cross-sectional view of a retaining member according to the second modification of the embodiment.

A second modification of the embodiment will be described. FIG. 13 is a perspective view of an engaging member according to the second modification of the embodiment, and FIG. 14 is a cross-sectional view of a retaining member according to the second modification of the embodiment. A retaining member 1 according to the second modification of the embodiment is different from the retaining member 1 of the above embodiment in the shapes of the protrusion and the facing wall, for example.

As illustrated in FIG. 13, the engaging member 10 according to the second modification of the embodiment includes a groove 11, an engaging piece 12, and a locking portion 13 similar to those of the engaging member 10 of the above embodiment. The engaging member 10 according to the second modification includes a protrusion 18 and a facing wall 19. The protrusion 18 is provided at a position similar to the protrusion 14 of the above embodiment, while the facing wall 19 is provided at a position similar to the facing wall 15 of the above embodiment. Accordingly, the protrusion 18 and the facing wall 19 are disposed adjacent to the opening 1a and face each other across the central axis of the opening 1a.

As illustrated in FIG. 13, the protrusion 18 protrudes toward one side X1 in the first direction X. The protrusion 18 when viewed from the extending direction Y has a rectangular shape. The protrusion 18 is raised in the extending direction Y with respect to the end surface 10c. That is, the protrusion 18 is shifted toward the side opposite to the groove 11 with respect to the end surface 10c. The protrusion 18 has a facing surface 18a. The facing surface 18a faces the groove 11. The facing surface 18a is parallel to the first direction X and orthogonal to the extending direction Y.

The facing wall 19 of the second modification is a part of an arc-shaped partition wall including the end surface 10c. That is, a facing surface 19a of the facing wall 19 is a part of the end surface 10c. The facing surface 19a faces the side opposite to the groove 11.

FIG. 14 illustrates a cross section of the retaining member 1 according to the second modification. Note that illustration of the exterior member 2 is omitted. In the retaining member 1 of FIG. 14, the first member 10A and the second member 10B are most separated within a range allowed by the clearance of the engagement structure 30. The protrusion 18 and the facing wall 19 face each other in the extending direction Y. More specifically, the facing surface 18a of the protrusion 18 and the facing surface 19a of the facing wall 19 face each other. The distance between the two facing surfaces 18a and 19a is determined to be able to regulate the entry of the electric wire 3.

In the retaining member 1 of the second modification, the two facing surfaces 18a and 19a are surfaces parallel to the first direction X. Therefore, the protrusion 18 and the facing wall 19 of the second modification can appropriately suppress the entry of the electric wire 3 into the gap between the first member 10A and the second member 10B.

Third Modification of Embodiment

Figure 15:
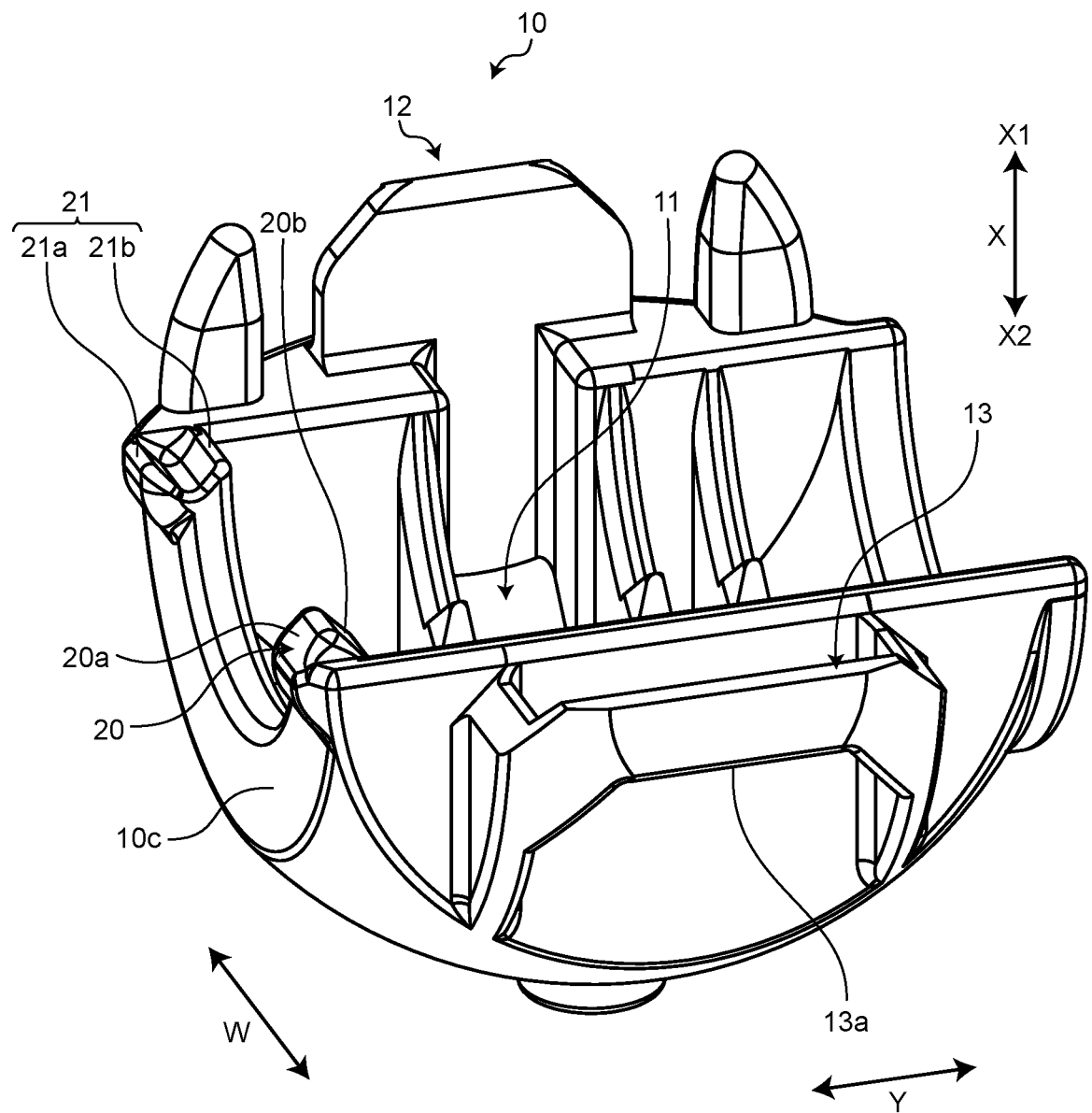
FIG. 15 is a perspective view of an engaging member according to a third modification of the embodiment.
Figure 16:
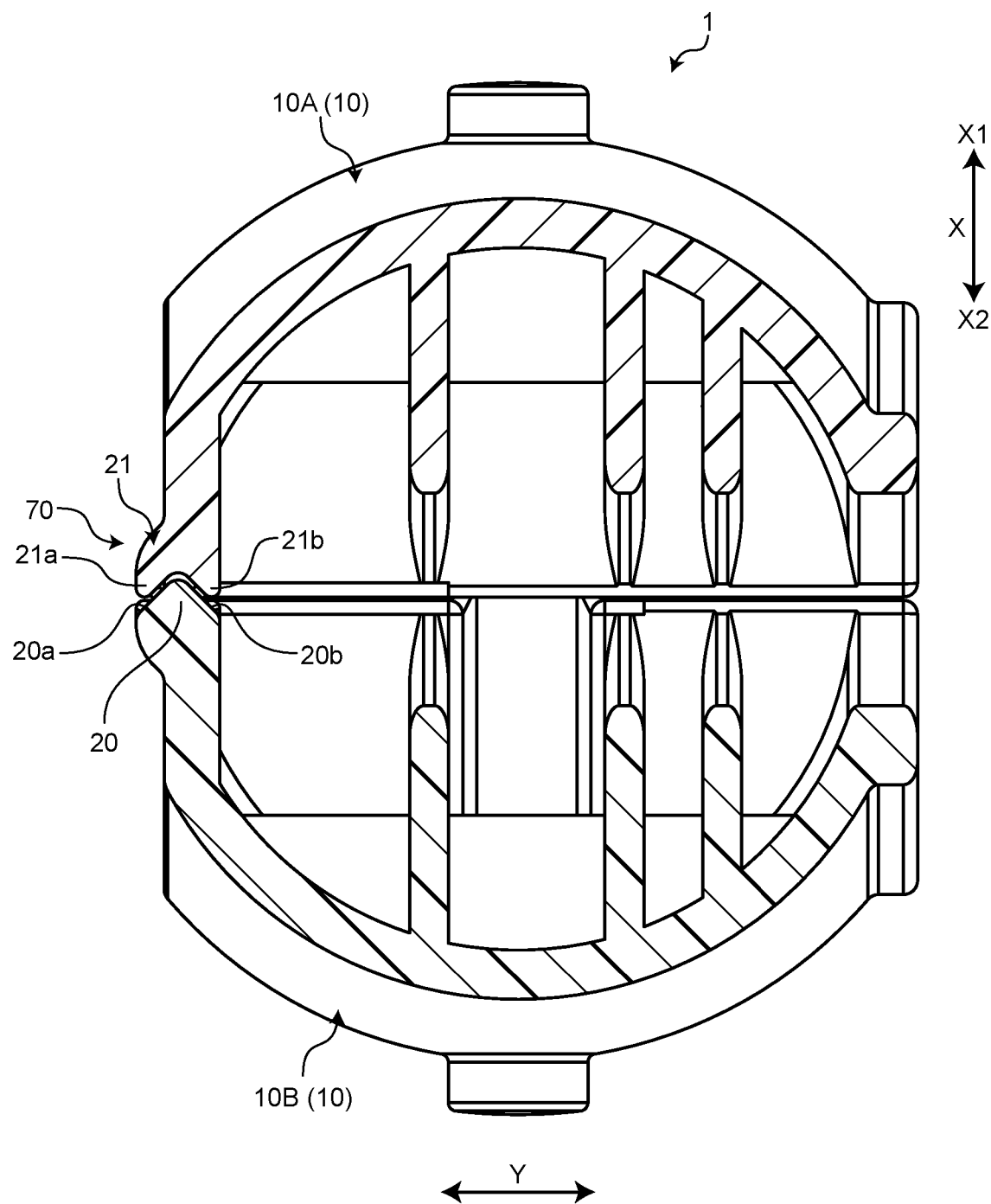
FIG. 16 is a cross-sectional view of a retaining member according to the third modification of the embodiment.

A third modification of the embodiment will be described. FIG. 15 is a perspective view of an engaging member according to the third modification of the embodiment, and FIG. 16 is a cross-sectional view of a retaining member according to the third modification of the embodiment. A retaining member 1 according to the third modification of the embodiment is different from the retaining member 1 of the above embodiment in the shapes of the protrusion and the facing wall, for example.

As illustrated in FIG. 15, an engaging member 10 according to the third modification of the embodiment includes a groove 11, an engaging piece 12, and a locking portion 13 similar to those of the engaging member 10 of the above embodiment. The engaging member 10 according to the third modification includes a protrusion 20 and a facing wall 21. The protrusion 20 is provided at a position similar to the facing wall 15 of the above embodiment, while the facing wall 21 is provided at a position similar to the protrusion 14 of the above embodiment. That is, the protrusion 20 and the facing wall 21 are disposed adjacent to the opening 1a, and face each other across the central axis of the opening 1a.

As illustrated in FIG. 15, the protrusion 20 protrudes toward one side X1 in the first direction X. The protrusion 20 when viewed from the extending direction Y has a rectangular or trapezoidal shape. The protrusion 20 has a tapered shape in which the width in the extending direction Y decreases toward the one side X1 in the first direction X. The protrusion 20 has two facing surfaces 20a and 20b. The first facing surface 20a faces the side opposite to the groove 11, and the second facing surface 20b faces the groove 11. The first facing surface 20a is inclined with respect to the first direction X so as to approach the groove 11 toward one side X1 of the first direction X. The second facing surface 20b is inclined with respect to the first direction X so as to be away from the groove 11 toward one side X1 of the first direction X.

The facing wall 21 has a first facing wall 21a and a second facing wall 21b. The first facing wall 21a faces the first facing surface 20a. The second facing wall 21b faces the second facing surface 20b. The two facing walls 21a and 21b are arranged side by side in the extending direction Y. The first facing wall 21a and the second facing wall 21b form a recess corresponding to the protrusion 20.

FIG. 16 illustrates a cross section of the retaining member 1 according to the third modification. Note that illustration of the exterior member 2 is omitted. In the retaining member 1 of FIG. 16, the first member 10A and the second member 10B are most separated within a range allowed by the clearance of the engagement structure 30. The protrusion 20 and the facing wall 21 face each other in the extending direction Y. More specifically, the first facing surface 20a of the protrusion 20 faces the facing surface of the first facing wall 21a. The distance between the first facing surface 20a and the first facing wall 21a is determined to be able to regulate the entry of the electric wire 3. The second facing surface 20b of the protrusion 20 faces the facing surface of the second facing wall 21b. The distance between the second facing surface 20b and the second facing wall 21b is determined to be able to regulate the entry of the electric wire 3.

In the retaining member 1 of the third modification, the regulating structure 70 constituted with the protrusion 20 and the facing wall 21 has two facing walls 21a and 21b arranged in the extending direction Y across the protrusion 20. That is, the electric wire 3 cannot easily enter between the protrusion 20 and the facing wall 21 from any side in the extending direction Y. Accordingly, the protrusion 20 and the facing wall 21 according to the third modification can appropriately suppress the entry of the electric wire 3 into the gap between the first member 10A and the second member 10B.

Fourth Modification of Embodiment

Figure 17:
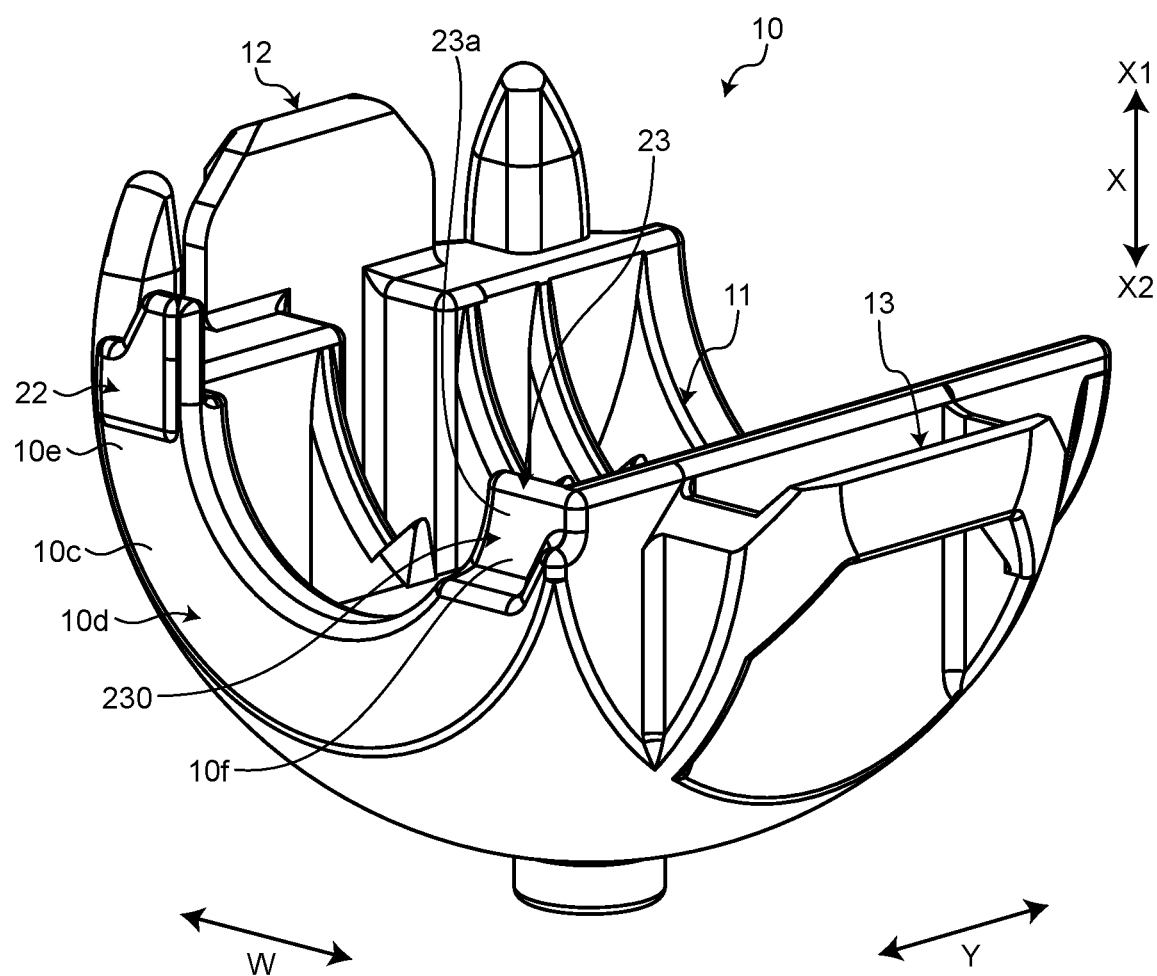
FIG. 17 is a perspective view of an engaging member according to a fourth modification of the embodiment.
Figure 18:
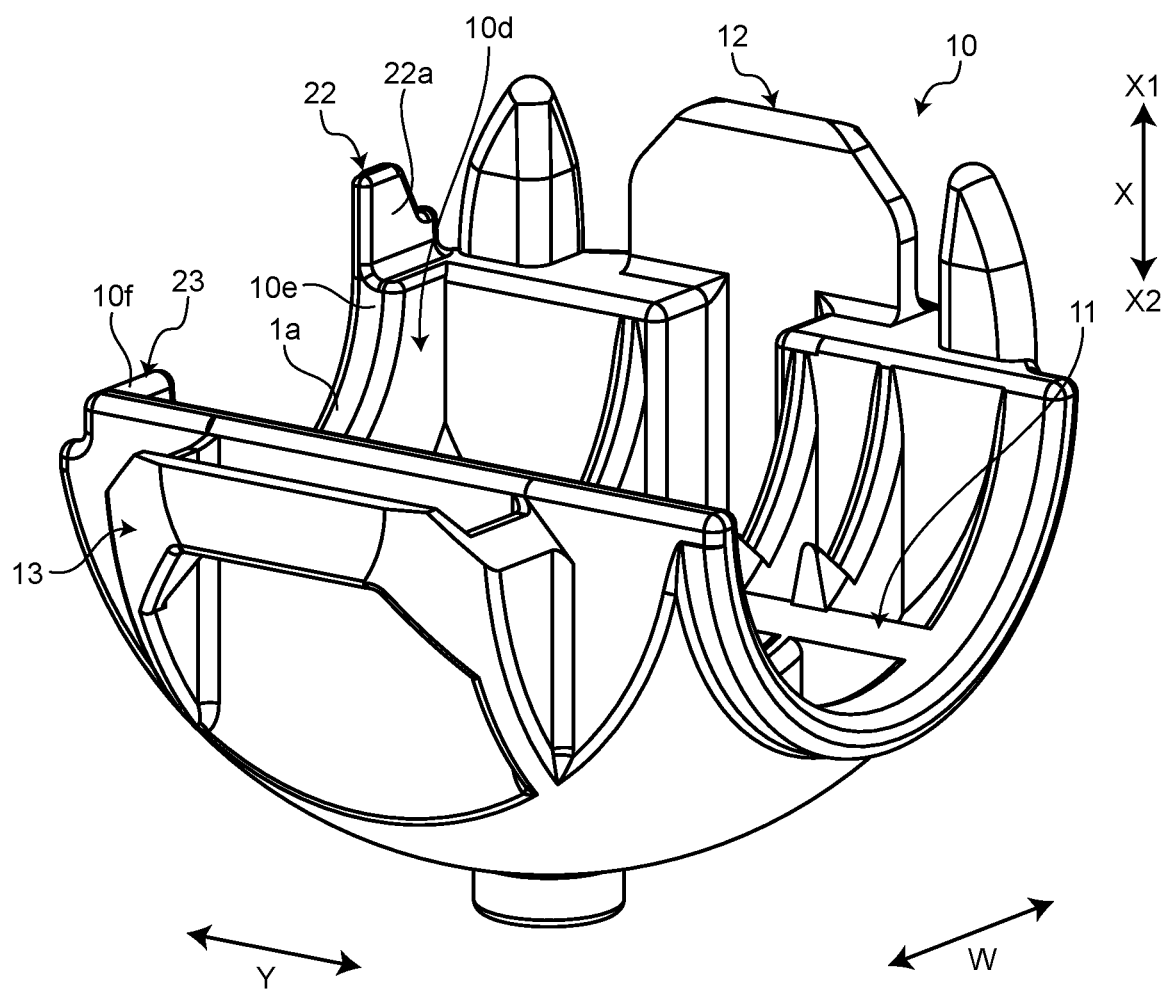
FIG. 18 is a perspective view of the engaging member according to the fourth modification of the embodiment.
Figure 19:
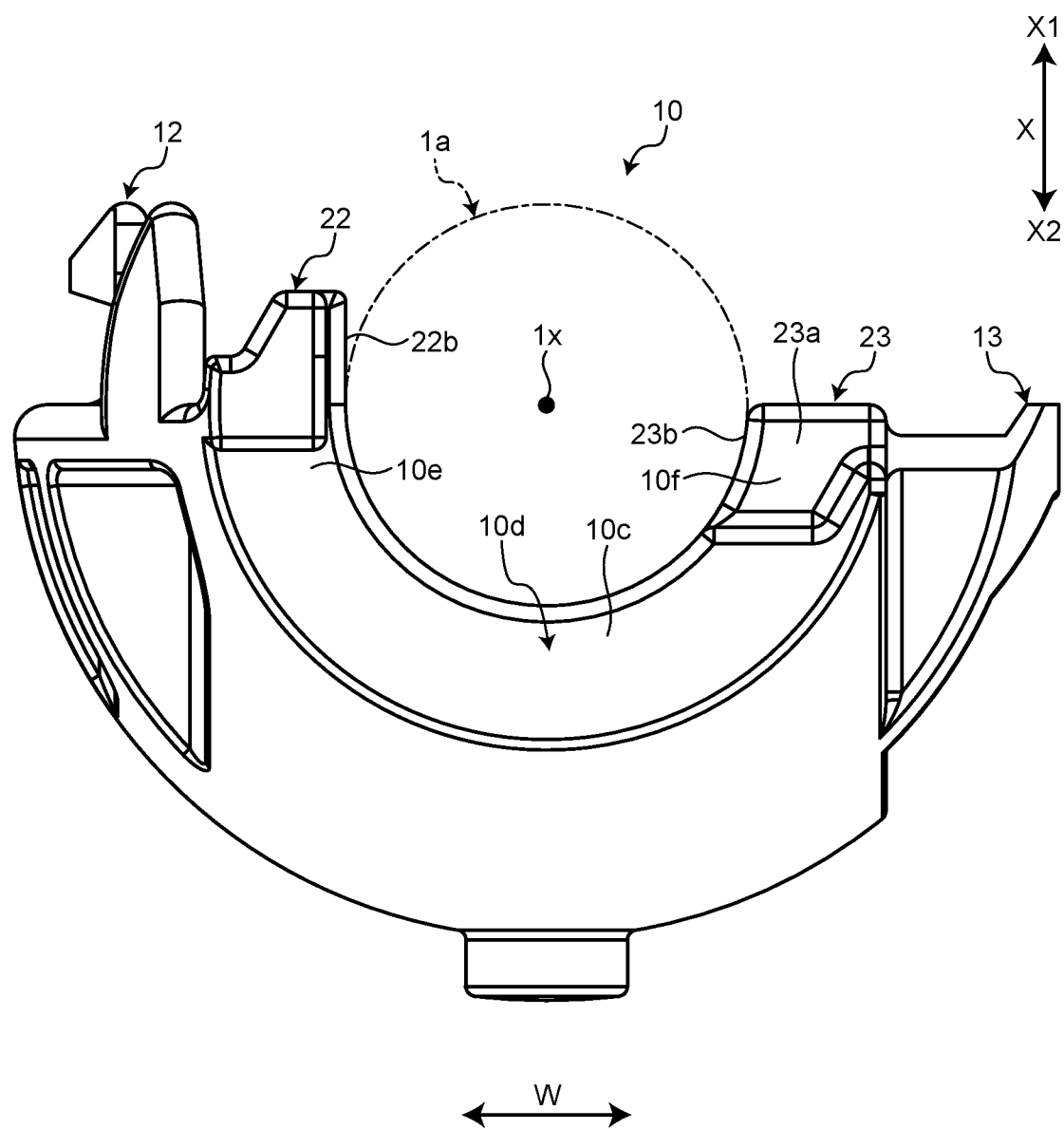
FIG. 19 is a front view of the engaging member according to the fourth modification of the embodiment.
Figure 20:
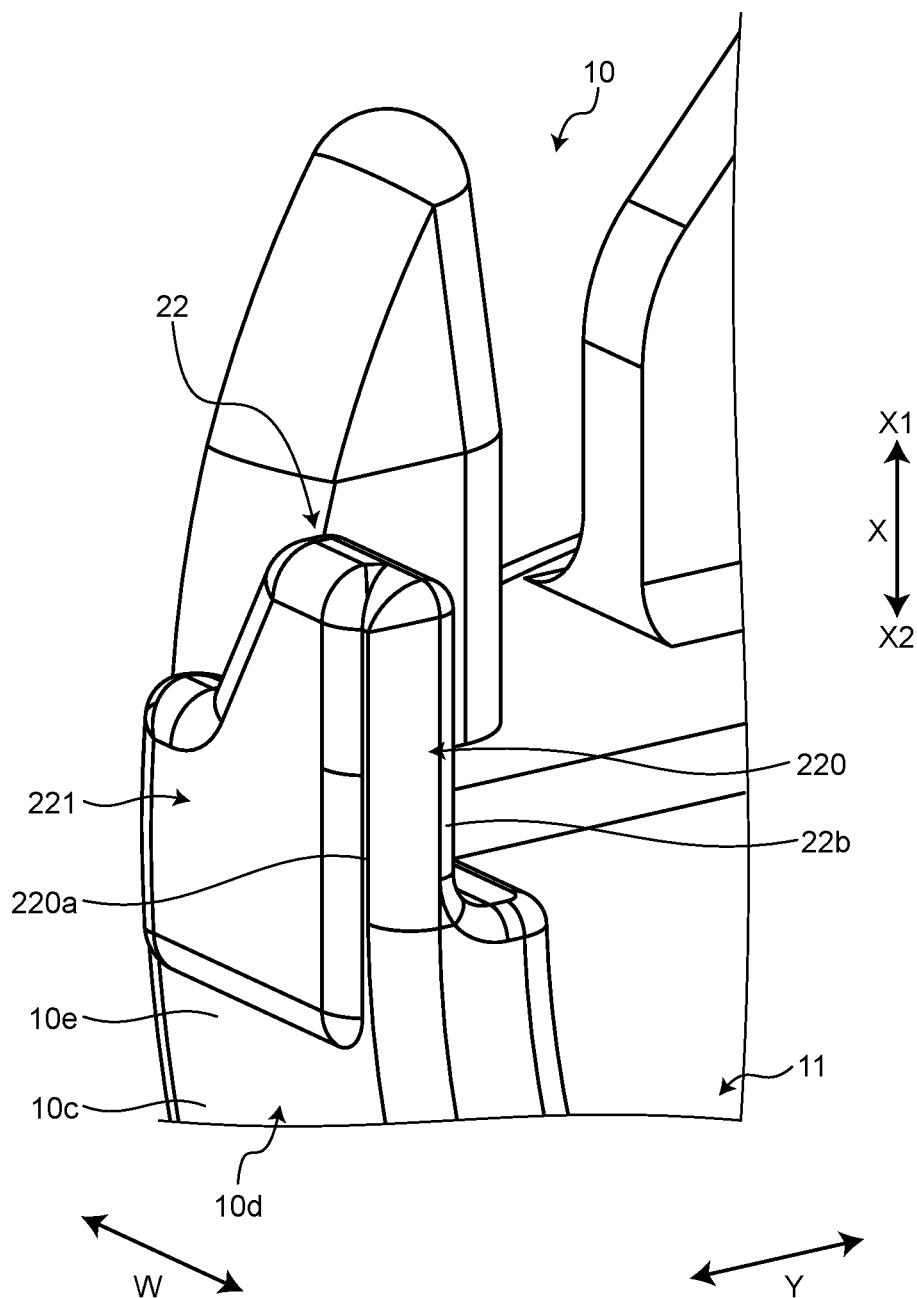
FIG. 20 is a perspective view of the engaging member according to the fourth modification of the embodiment.
Figure 21:
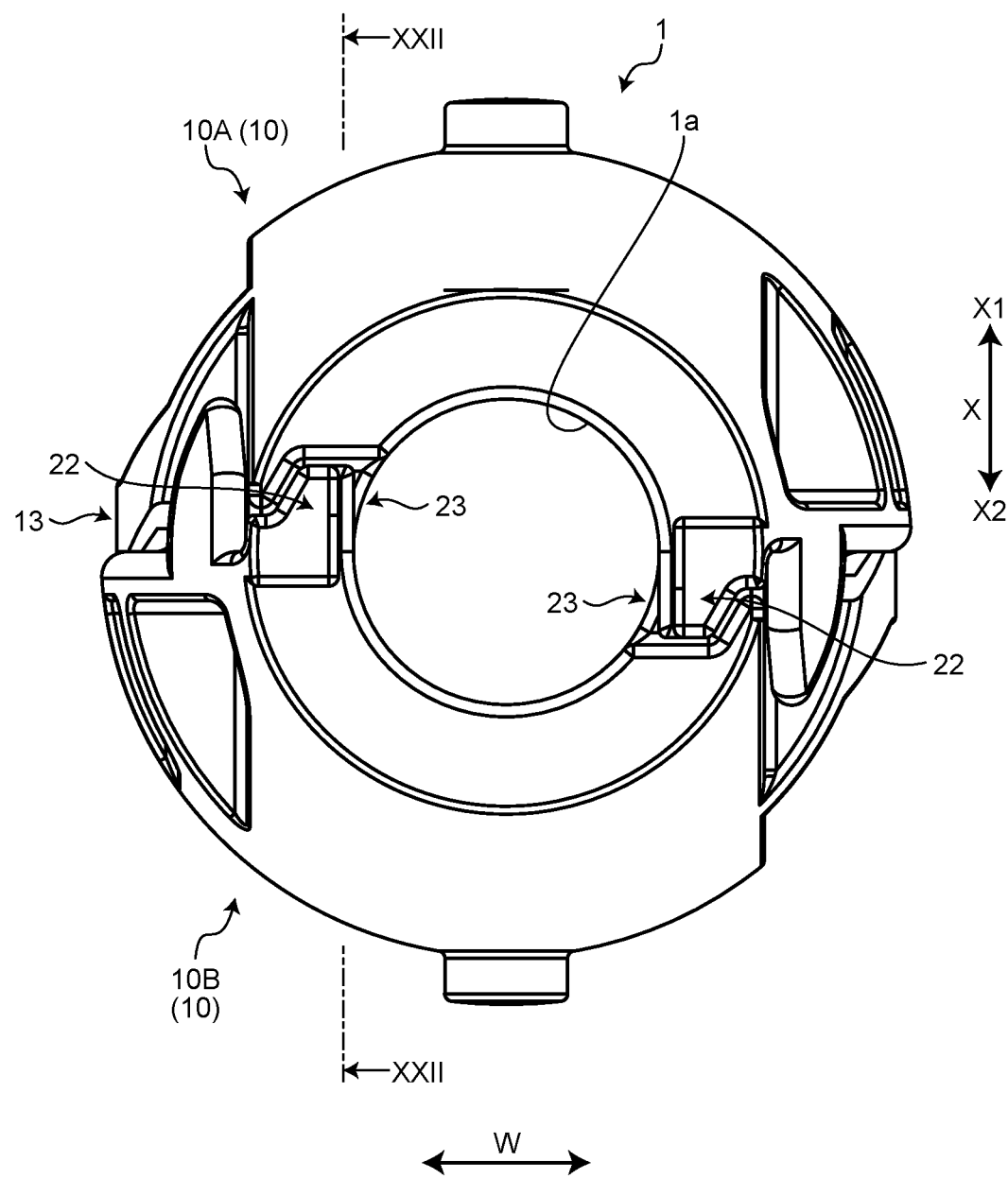
FIG. 21 is a front view of a retaining member according to the fourth modification of the embodiment.
Figure 22:
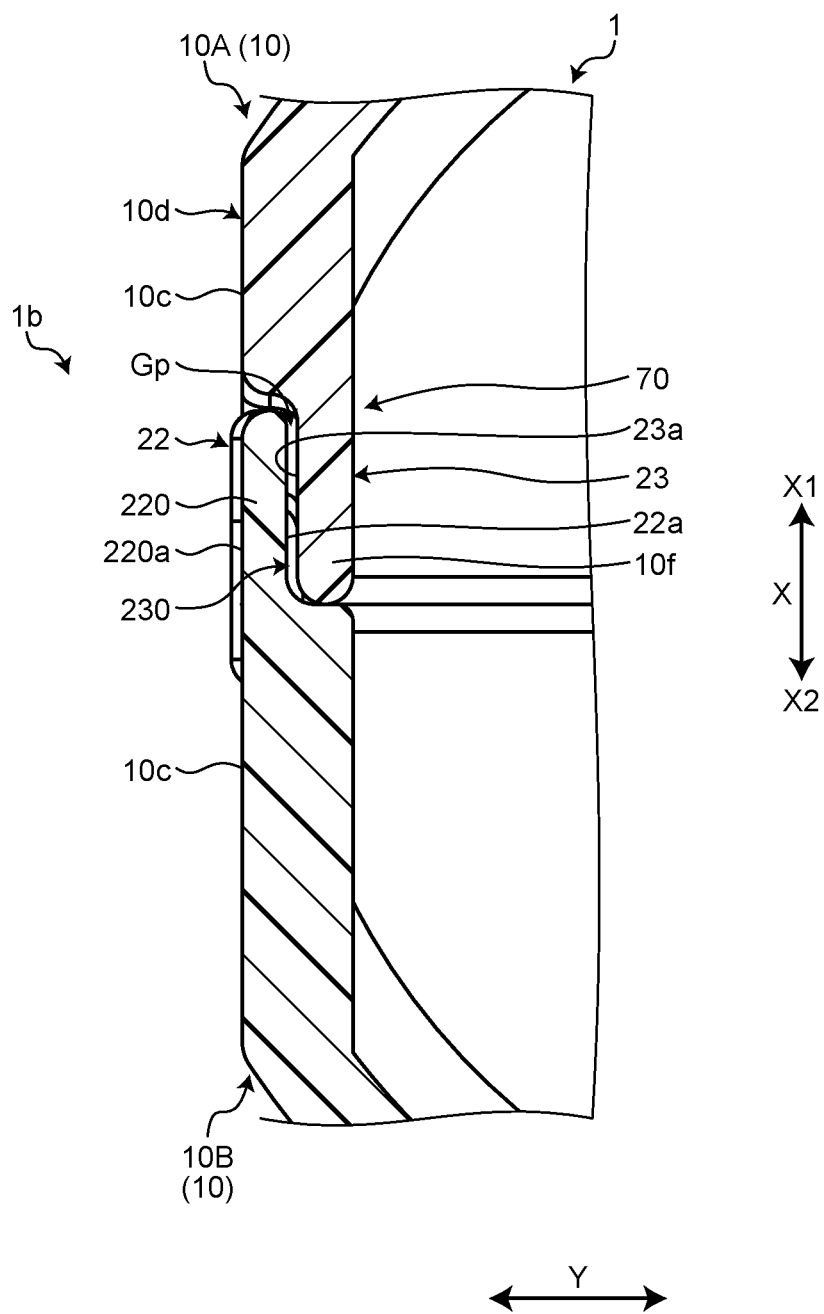
FIG. 22 is a cross-sectional view of the retaining member according to the fourth modification of the embodiment.
Figure 23:
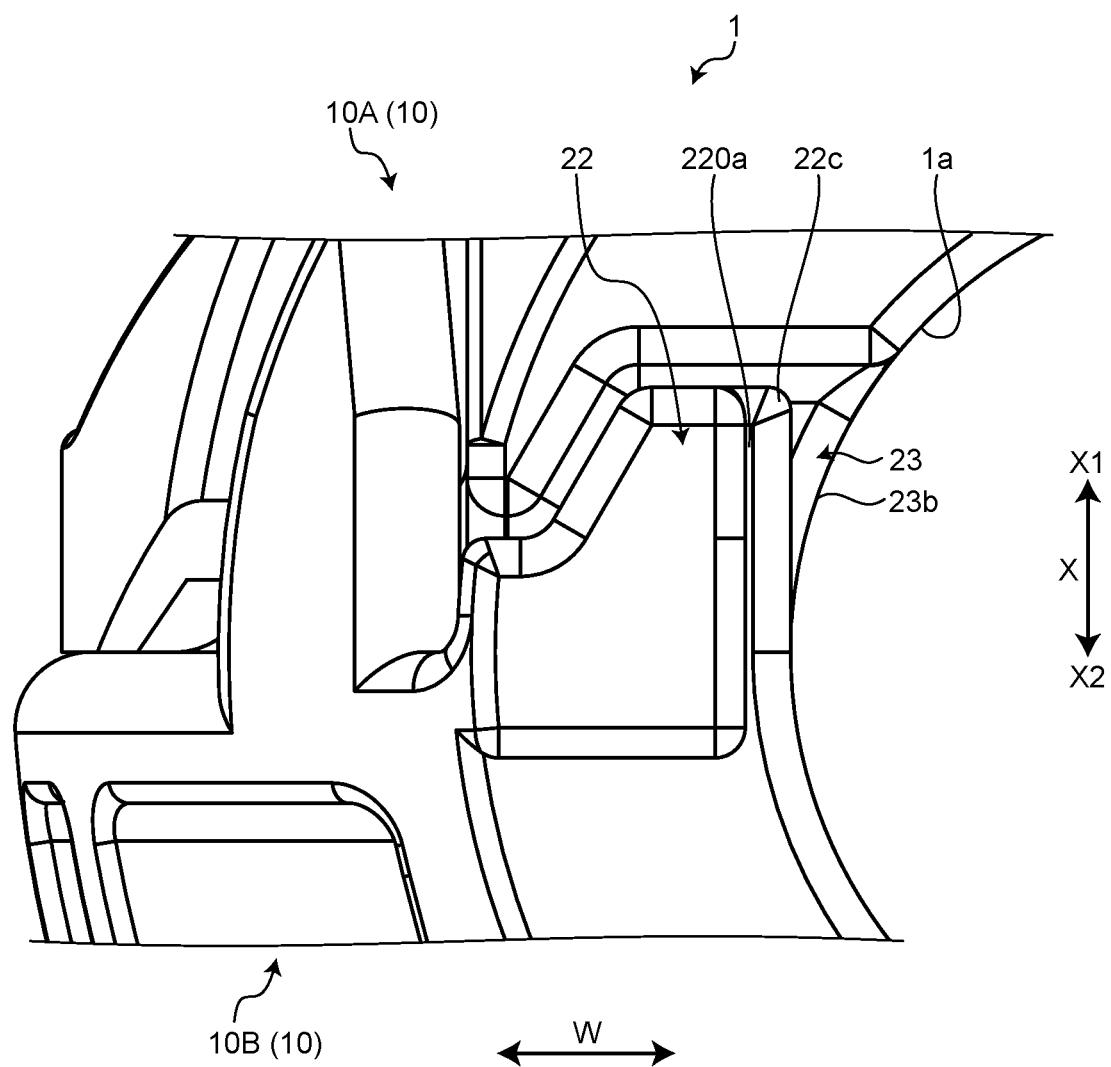
FIG. 23 is a front view of the retaining member according to the fourth modification of the embodiment.

A fourth modification of the embodiment will be described. FIGS. 17 and 18 are perspective views of an engaging member according to the fourth modification of the embodiment, FIG. 19 is a front view of the engaging member according to the fourth modification of the embodiment, FIG. 20 is a perspective view of the engaging member according to the fourth modification of the embodiment, FIG. 21 is a front view of a retaining member according to the fourth modification of the embodiment, FIG. 22 is a cross-sectional view of the retaining member according to the fourth modification of the embodiment, and FIG. 23 is a front view of the retaining member according to the fourth modification of the embodiment. The retaining member 1 according to the fourth modification of the embodiment is different from the retaining member 1 of the above embodiment in that a protrusion 22 is housed in a wall 10d so as not to stick out.

As illustrated in FIGS. 17 to 19, an engaging member 10 according to the fourth modification of the embodiment includes a groove 11, an engaging piece 12, and a locking portion 13 similar to those of the engaging member 10 of the above embodiment. The engaging member 10 according to the fourth modification includes a protrusion 22 and a facing wall 23. The engaging member 10 has an arc-shaped wall 10d similarly to the engaging member 10 of the above embodiment. The wall 10d is disposed at an end on the opening 1a side in the extending direction Y. The wall 10d has an end surface 10c having an arc shape and surrounding the opening 1a.

The protrusion 22 protrudes in the first direction X from a first end 10e in the circumferential direction of the wall 10d. The first end 10e is one end of the wall 10d. The facing wall 23 is a second end 10f in the circumferential direction of the wall 10d. The second end 10f is the other end of the wall 10d. As illustrated in FIG. 19, the protrusion 22 and the facing wall 23 are disposed adjacent to the opening 1a and face each other across the central axis 1x of the opening 1a.

The protrusion 22 protrudes from the first end 10e toward the one side X1 in the first direction X. The protrusion 22 is formed in a plate shape. The protrusion 22 when viewed from the extending direction Y has a substantially trapezoidal shape. The protrusion 22 has a tapered shape in which the length in the width direction W decreases toward the one side X1 in the first direction X.

The thickness of the protrusion 22 is smaller than the thickness of the wall 10d. That is, the protrusion 22 is a piece thinner than the wall 10d. The position of the protrusion 22 in the extending direction Y is a position on the end surface 10c side of the wall 10d. In other words, the protrusion 22 protrudes from a position facing the external space in the wall 10d.

The facing wall 23 is disposed at the second end 10f of the wall 10d. The facing wall 23 illustrated as an example is formed by recessing the second end 10f. As illustrated in FIG. 17, the second end 10f has a recess 230 recessed in the extending direction Y. The recess 230 is formed to be able to house the protrusion 22. The facing wall 23 is a bottom wall of the recess 230. In other words, the wall 10d is recessed toward the groove 11 with respect to the end surface 10c in the portion of the facing wall 23. The thickness of the facing wall 23 is smaller than the thickness of the other portions of the wall 10d. That is, the facing wall 23 is a piece thinner than a portion of the wall 10d adjacent to the facing wall 23.

The facing wall 23 has a facing surface 23a. The facing surface 23a is a bottom surface of the recess 230. The facing surface 23a faces the side opposite to the groove 11. The facing surface 23a is parallel to the first direction X and orthogonal to the extending direction Y.

As illustrated in FIG. 18, the protrusion 22 has a facing surface 22a. The facing surface 22a faces the groove 11. The facing surface 22a is parallel to the first direction X and orthogonal to the extending direction Y.

As illustrated in FIG. 19, the facing wall 23 has an edge 23b having an arc shape and forming the opening 1a. The edge 23b is one side of the facing wall 23 and faces the central axis 1x side of the opening 1a. The edge 23b has an arc shape centered on the central axis 1x.

The protrusion 22 has an edge 22b facing the central axis 1x. The edge 22b extends in the first direction X. The edge 22b illustrated as an example is shaped in a straight line and in the tangent to the opening 1a. In other words, the edge 22b extends in a tangential direction of the inner circumference of the wall 10d. The edge 22b is located outward in the radial direction with respect to the opening 1a.

As illustrated in FIG. 20, the protrusion 22 has a main body 220 and a ridge 221. The main body 220 is a portion continuous with the wall 10d and has an end surface 220a. The end surface 220a is a surface orthogonal to the extending direction Y, and faces the external space of the engaging member 10. In other words, the end surface 220a faces the side opposite to the groove 11. The end surface 220a is a surface continuous with the end surface 10c of the wall 10d. The end surface 220a is connected to the edge 22b. That is, the end surface 220a is a portion adjacent to the opening 1a. In this manner, the protrusion 22 of the present modification is formed such that a portion adjacent to the opening 1a does not protrude in the extending direction Y with respect to the end surface 10c.

The ridge 221 is raised from the main body 220 in the extending direction Y. The ridge 221 is raised toward the external space of the engaging member 10 with respect to the end surface 220a. The ridge 221 is located outside the end surface 220a in the radial direction.

FIG. 21 illustrates a front view of the first member 10A and the second member 10B engaged with each other. FIG. 22 illustrates a cross section taken along line XXII-XXII of FIG. 21. In the retaining member 1 of FIG. 22, the first member 10A and the second member 10B are most separated within a range allowed by the clearance of the engagement structure 30. The protrusion 22 and the facing wall 23 face each other in the extending direction Y. More specifically, the protrusion 22 is positioned on the side of an external space 1b with respect to the facing wall 23. The facing surface 22a of the protrusion 22 faces the facing surface 23a of the facing wall 23. The distance between the two facing surfaces 22a and 23a is determined to be able to regulate the entry of the electric wire 3.

As illustrated in FIG. 22, the protrusion 22 of the second member 10B is housed in the recess 230 of the first member 10A. The recess 230 has a depth capable of housing the protrusion 22. Since the protrusion 22 is housed in the recess 230, the protrusion 22 is less likely to stick out from the end surface 10c. In other words, a step is less likely to be generated between the end surface 10c of the first member 10A and the protrusion 22 of the second member 10B, and a step, if generated, will be a small step. This makes it possible for the retaining member 1 of the fourth modification to suppress the entry of the electric wire 3 into a gap Gp between the protrusion 22 and the facing wall 23.

With the presence of a large step between the protrusion 22 and the end surface 10c when a tensile force acts on the electric wire 3 after the wire harness WH is fixed, the electric wire 3 can be caught by the protrusion 22 to allow the electric wire 3 to enter the gap Gp. In the retaining member 1 of the fourth modification, the protrusion 22 is housed in the recess 230, making it possible to suppress the entry of the electric wire 3 in the gap Gp.

The protrusion 22 of the first member 10A and the recess 230 of the second member 10B are similarly formed. That is, the protrusion 22 of the first member 10A is housed in the recess 230 of the second member 10B. This suppress the entry of the electric wire 3 into the gap Gp between the protrusion 22 of the first member 10A and the recess 230 of the second member 10B.

In the retaining member 1 illustrated as an example, the end surface 10c of the first member 10A and the end surface 220a of the second member 10B are located on a same plane in a state where the first member 10A and the second member 10B are engaged with each other. This makes it possible to further reliably suppress the entry of the electric wire 3 into the gap Gp between the protrusion 22 and the facing wall 23. The similar applies to the relationship between the end surface 10c of the second member 10B and the end surface 220a of the first member 10A. That is, the end surface 10c of the second member 10B and the end surface 220a of the first member 10A are located on a same plane.

As illustrated in FIG. 23, the protrusion 22 is located outside the edge 23b of the facing wall 23 in the radial direction of the opening 1a. More specifically, the edge 22b of the protrusion 22 is located outward in the radial direction with respect to the edge 23b of the facing wall 23. Therefore, the electric wire 3 is less likely to be caught by a corner 22c of the protrusion 22. This suppresses the entry of the electric wire 3 into the gap Gp between the protrusion 22 and the facing wall 23.

As described above, the first member 10A and the second member 10B of the present modification are provided with the arc-shaped wall 10d surrounding the opening 1a. The protrusion 22 is located on the side of the external space 1b with respect to the facing wall 23 in the extending direction Y. The protrusion 22 protrudes in the first direction X from a first end 10e in the circumferential direction of the wall 10d. The facing wall 23 is a second end 10f in the circumferential direction of the wall 10d. The second end 10f of the wall 10d has the recess 230 recessed in the extending direction Y, and houses the protrusion 22 in the recess 230. With such a configuration, the protrusion 22 is less likely to stick out from the wall 10d. This makes it possible for the retaining member 1 of the present modification to suppress entry of the electric wire 3 into the gap Gp between the protrusion 22 and the facing wall 23.

The opening 1a when viewed from the extending direction Y has a circular shape. The facing wall 23 has the arc-shaped edge 23b forming the opening 1a. The protrusion 22 is positioned outside the edge 23b in the radial direction of the opening 1a. This makes it possible for the retaining member 1 of the present modification to suppress entry of the electric wire 3 into the gap Gp between the protrusion 22 and the facing wall 23.

The contents disclosed in the above embodiment and modifications can be executed in appropriate combination with each other.

The regulating structure of the retaining member according to the present embodiment is formed such that the protrusion and the facing wall overlap each other when viewed from the extending direction in a state where the first member and the second member are most separated from each other within a range allowed by a clearance of the engagement structure. According to the retaining member of the present embodiment, it is possible to suppress the pinching of electric wires between the members.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A retaining member comprising:
a first member and a second member, the members configured to retain a tip end of an exterior member having a cylindrical shape,
wherein the first member and the second member have an engagement structure that engages with each other in a first direction, and the engagement structure engages with each other to form; a retaining structure that retains the tip end, and an opening through which an electric wire inserted into the exterior member is drawn out to an external space,
the retaining structure has grooves provided in the first member and the second member, and retains the tip end by sandwiching the tip end between the groove of the first member and the groove of the second member,
the first member and the second member are provided with a regulating structure that is disposed adjacent to the opening and regulates pinching of the electric wire in a gap between the first member and the second member,
the regulating structure includes; a protrusion provided on one of the first member and the second member, and a facing wall provided on the other of the first member and the second member,
the protrusion and the facing wall face each other in an extending direction of the groove, and
the regulating structure is configured such that the protrusion and the facing wall overlap each other when viewed from the extending direction in a state where the first member and the second member are most separated from each other within a range allowed by a clearance of the engagement structure.

2. The retaining member according to claim 1, wherein the regulating structure includes two facing walls arranged in the extending direction across the protrusion.

3. The retaining member according to claim 1, wherein each of the protrusion and the facing wall has a facing surface orthogonal to the extending direction, and
the facing surface of the protrusion and the facing surface of the facing wall face each other in a state where the first member and the second member are most separated from each other within a range allowed by a clearance of the engagement structure.

4. The retaining member according to claim 1, wherein the first member and the second member have a wall having an arc shape and surrounding the opening,
the protrusion is located on a side of the external space with respect to the facing wall in the extending direction,
the protrusion protrudes in the first direction from a first end in a circumferential direction of the wall,
the facing wall is a second end in the circumferential direction of the wall, and
the second end of the wall has a recess recessed in the extending direction, and houses the protrusion in the recess.

5. The retaining member according to claim 1, wherein the opening when viewed from the extending direction has a circular shape,
the facing wall has an edge having an arc shape and forming the opening, and
the protrusion is located outside the edge in a radial direction of the opening.

6. A wire harness comprising:
an exterior member having a cylindrical shape;
an electric wire inserted into the exterior member;
a retaining member that retains a tip end of the exterior member; and
a protector that rotatably supports the retaining member,
wherein the retaining member includes: a first member and a second member, the members configured to retain the tip end,
the first member and the second member have an engagement structure that engages with each other in a first direction, and the engagement structure engages with each other to form; a retaining structure that retains the tip end, and an opening through which an electric wire is drawn out to an external space,
the retaining structure has grooves provided in the first member and the second member, and retains the tip end by sandwiching the tip end between the groove of the first member and the groove of the second member,
the first member and the second member are provided with a regulating structure that is disposed adjacent to the opening and regulates pinching of the electric wire in a gap between the first member and the second member,
the regulating structure includes; a protrusion provided on one of the first member and the second member, and a facing wall provided on the other of the first member and the second member,
the protrusion and the facing wall face each other in an extending direction of the groove, and
the regulating structure is configured such that the protrusion and the facing wall overlap each other when viewed from the extending direction in a state where the first member and the second member are most separated from each other within a range allowed by a clearance of the engagement structure.

* * * * *